US012621866B2

(12) United States Patent
Kim et al.

(10) Patent No.: US 12,621,866 B2
(45) Date of Patent: May 5, 2026

(54) METHOD AND DEVICE FOR SSB TRANSMISSION/RECEPTION IN WIRELESS COMMUNICATION SYSTEM

(71) Applicant: Samsung Electronics Co., Ltd., Suwon-si (KR)

(72) Inventors: Hanjin Kim, Suwon-si (KR); Seunghyun Lee, Suwon-si (KR); Hyojin Lee, Suwon-si (KR); Yosub Park, Suwon-si (KR); Jaehyun Lee, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 18/039,451

(22) PCT Filed: Dec. 6, 2021

(86) PCT No.: PCT/KR2021/018332
§ 371 (c)(1),
(2) Date: May 30, 2023

(87) PCT Pub. No.: WO2022/131645
PCT Pub. Date: Jun. 23, 2022

(65) Prior Publication Data
US 2023/0422310 A1     Dec. 28, 2023

(30) Foreign Application Priority Data
Dec. 14, 2020    (KR) ........................ 10-2020-0174437

(51) Int. Cl.
*H04W 74/08*      (2024.01)
*H04L 5/00*       (2006.01)
(Continued)

(52) U.S. Cl.
CPC ....... *H04W 74/0833* (2013.01); *H04L 5/0048* (2013.01); *H04W 48/10* (2013.01); *H04W 56/001* (2013.01); *H04W 72/0453* (2013.01)

(58) Field of Classification Search
CPC ............. H04W 72/0453; H04W 48/10; H04W 56/001; H04W 74/0833; H04W 56/0015;
(Continued)

(56) References Cited

U.S. PATENT DOCUMENTS 10,425,264 B2    9/2019   Ko et al.
10,912,129 B2    2/2021   Zhang et al.
(Continued)

FOREIGN PATENT DOCUMENTS

CN       109041593 A     12/2018
KR     10-2018-0116313 A  10/2018
KR     10-2020-0119797 A  10/2020

OTHER PUBLICATIONS

Apple Inc., On Beam Management Enhancement, R1-2006499, 3GPP TSG RAN WG1 #102-e, Aug. 8, 2020.
(Continued)

*Primary Examiner* — Brian D Nguyen
(74) *Attorney, Agent, or Firm* — Jefferson IP Law, LLP

(57) ABSTRACT

The present disclosure relates to a 5G or 6G communication system for supporting a data transmission rate higher than that of a 4G communication system, such as LTE. A transmission or reception method of a terminal in a wireless communication system may comprise the steps of receiving a synchronization signal block (SSB) from a base station on the basis of blind detection, on the basis of the received SSB, identifying information on an SSB group to which the SSB belongs, wherein the SSB group is related to a first frequency domain, on the basis of the information on the SSB group, identifying a second frequency domain correspond-
(Continued)

ing to at least one other SSB group, and receiving at least one SSB belonging to the at least one other SSB group from the base station on the basis of the second frequency domain.

15 Claims, 21 Drawing Sheets

(51) Int. Cl.
*H04W 48/10* (2009.01)
*H04W 56/00* (2009.01)
*H04W 72/0453* (2023.01)
*H04W 74/0833* (2024.01)

(58) Field of Classification Search
CPC ......... H04L 5/0053; H04L 1/00; H04L 5/005; H04L 5/0048; H04L 5/0094; H04J 11/00
See application file for complete search history.

(56) References Cited

U.S. PATENT DOCUMENTS

| 2019/0045559 | A1 | 2/2019 | Huang et al. |
| 2019/0140881 | A1 | 5/2019 | Akkarakaran et al. |
| 2019/0380099 | A1 | 12/2019 | Hakola et al. |
| 2020/0296765 | A1 | 9/2020 | Kim et al. |
| 2020/0337002 | A1* | 10/2020 | Ko ........................ H04L 5/0016 |
| 2021/0274561 | A1 | 9/2021 | Li et al. |
| 2022/0108491 | A1* | 4/2022 | Ray ...................... H04N 19/597 |
| 2023/0123975 | A1* | 4/2023 | Zhang ................ H04W 56/001 370/329 |
| 2023/0180297 | A1* | 6/2023 | Shin .................... H04W 74/006 370/329 |
| 2023/0224836 | A1* | 7/2023 | Wu ................... H04W 56/0015 370/503 |
| 2023/0328793 | A1* | 10/2023 | Christoffersson .... H04B 7/0695 370/329 |

OTHER PUBLICATIONS

Huawei et al., Sidelink synchronization mechanisms for NR V2X, R1-1910057, 3GPP TSG RAN WG1 #98bis, Chongqing, China, Oct. 8, 2019.

Fujitsu, Discussion of sidelink synchronization mechanism for NR V2X, R1-1912081, 3GPP TSG RAN WG1 #99, Reno, USA, Nov. 8, 2019.

ETSI TS 138 211 V17.3.0 (Sep. 2022) 5G; NR; Physical channels and modulation (3GPP TS 38.211 version 17.3.0 Release 17), Sep. 23, 2022.

* cited by examiner

Analog beam operation for each base station panel

START

Perform synchronization after receiving SSB
through blind detection                                    905

Identify, by UE, frequency domain of SSBs
belonging to different $(L_F-1)$ groups after identifying
group index through detected SSB                           906

Measure all RSRP values of L SSBs                          907

END

FIG. 10A

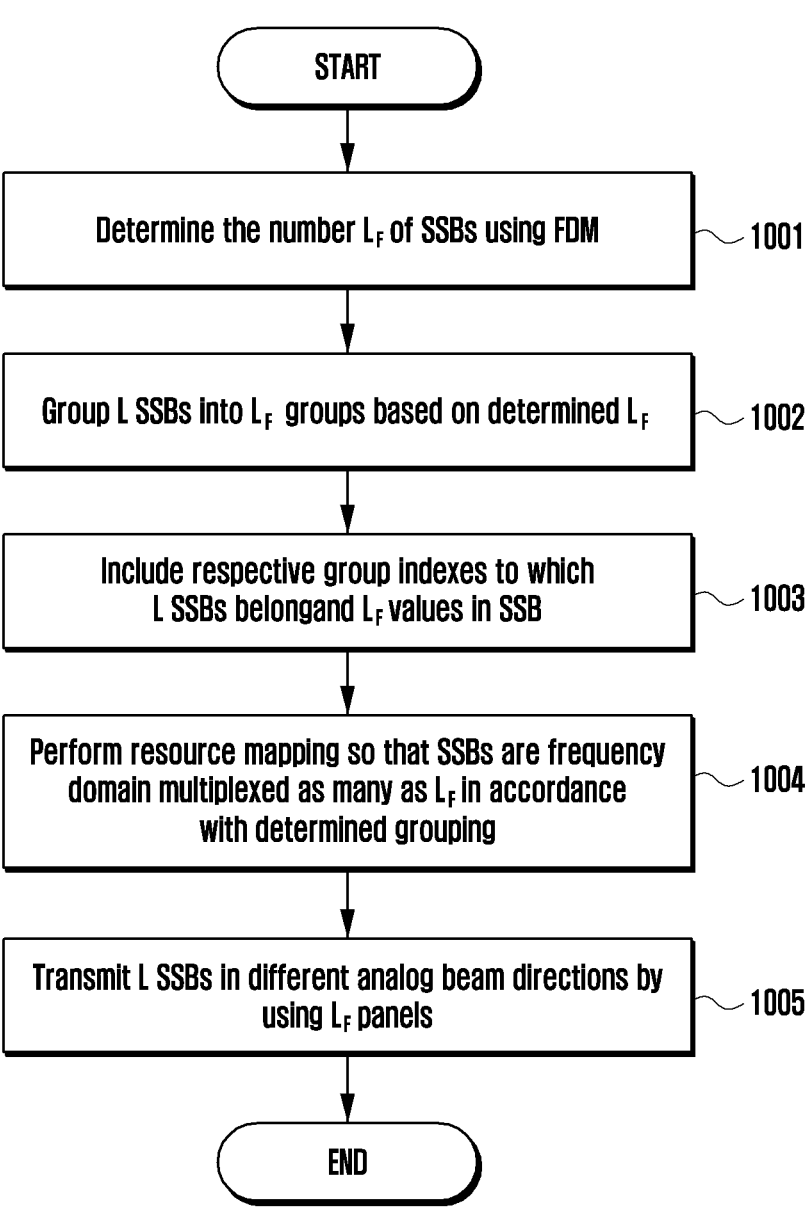

START

Determine the number $L_F$ of SSBs using FDM — 1001

Group L SSBs into $L_F$ groups based on determined $L_F$ — 1002

Include respective group indexes to which L SSBs belongand $L_F$ values in SSB — 1003

Perform resource mapping so that SSBs are frequency domain multiplexed as many as $L_F$ in accordance with determined grouping — 1004

Transmit L SSBs in different analog beam directions by using $L_F$ panels — 1005

END

METHOD AND DEVICE FOR SSB TRANSMISSION/RECEPTION IN WIRELESS COMMUNICATION SYSTEM

TECHNICAL FIELD

The disclosure relates to a method and a device for SSB transmission and reception to reduce a beam sweeping resource overhead in a wireless communication system.

BACKGROUND ART

In looking back on the development processes with the repetition of the wireless communication generations, technologies for mainly human-targeted services, such as voice, multimedia, and data, have been developed. Connected devices, which are explosively on the rise after commercialization of the $5^{th}$ generation (5G) communication system, have been expected to be connected to a communication network. Examples of things connected to the network may be vehicles, robots, drones, home appliances, displays, smart sensors installed in various kinds of infrastructures, construction machines, and factory equipment. Mobile devices are expected to be evolved to various form factors, such as augmented reality glasses, virtual reality headsets, and hologram devices. In the 6th generation (6G), in order to provide various services through connection of hundreds of billions of devices and things with one another, efforts for developing an improved 6G communication system have been made. For this reason, the 6G communication system is called a "beyond 5G system".

In the 6G communication system that is expected to be realized around 2030, the maximum transmission speed is tera (i.e., 1,000 giga) bps, and wireless latency is 100 microseconds (μ sec). That is, as compared with the 5G communication system, the transmission speed in the 6G communication system becomes 50 times faster, and the wireless latency is reduced to $\frac{1}{10}$.

In order to accomplish such a high data transmission speed and ultra-low latency, implementation of the 6G communication system in terahertz bands (e.g., 95 gigahertz (95 GHz) to 3 terahertz (3 THz) bands) is being considered. In the terahertz bands, due to more severe path loss and atmospheric absorption phenomena than those in the millimeter wave (mmWave) bands introduced in the 5G, importance of a technology to secure a signal reaching distance, that is, the coverage, is expected to become grower. As a primary technology to secure the coverage, it is required to develop a radio frequency (RF) element, antenna, more superior new waveform than the waveform of the orthogonal frequency division multiplexing (OFDM) in the coverage aspect, beamforming and massive multiple-input multiple-output (massive MIMO), full dimensional MIMO (FD-MIMO), array antenna, and multi-antenna transmission technology, such as large scale antenna technique. In addition, in order to improve the coverage of the terahertz band signals, new techniques, such as metamaterial-based lens and antenna, high-level spatial multiplexing technology using orbital angular momentum (OAM), and reconfigurable intelligent surface (RIS), are being discussed.

In addition, for frequency efficiency enhancement and system network improvement, in the 6G communication system, developments are under way in a full duplex technology in which an uplink and a downlink simultaneously utilize the same frequency resource at the same time, a network technology to integrally utilize a satellite and high-altitude platform station (HAPS), a network structure innovation technology to support a mobile base station and to enable network operation optimization and automation, a dynamic spectrum sharing technology through collision avoidance based on spectrum usage prediction, an AI-based communication technology to realize system optimization by utilizing artificial intelligence (AI) from a design stage and internalizing end-to-end AI support function, and a next-generation distributed computing technology to realize services having complexity that exceeds the limit of the UE operation capability by utilizing ultrahigh performance communication and computing resources (mobile edge computing (MEC) or cloud). In addition, attempts are continuing to further strengthen connectivity between devices through designing of a new protocol to be used in the 6G communication system, implementation of hardware-based security environment, development of a mechanism for safe utilization of data, and technical development of a privacy maintaining method, to further optimize the network, to accelerate software of network entities, and to increase openness of the wireless communication.

By such researches and developments of the 6G communication system, it is expected that the next hyper-connected experience is possible through hyper-connectivity of the 6G communication system including not only connection between things but also connection between a human and a thing in all. Specifically, it is expected that services, such as truly immersive extended reality (XR), high-fidelity mobile hologram, and digital replica, can be provided through the 6G communication system. Further, since services, such as remote surgery, industrial automation, and emergency response through increasing security and credibility, can be provided through the 6G communication system, the 6G communication system will be applied to various fields, such as industry, medical treatment, automobile, and home appliances.

DISCLOSURE OF INVENTION

Technical Problem

In case of the wireless communication in the terahertz bands, the number of beams being used is increased, and thus the resources for transmitting and receiving the synchronization signal block (SSB) are excessively required.

Solution to Problem

According to an embodiment of the disclosure, a transmission and reception method of a UE in a wireless communication system may include receiving a synchronization signal block (SSB) from a base station based on blind detection, identifying information about an SSB group to which the SSB belongs based on the received SSB, the SSB group being related to a first frequency domain, identifying a second frequency domain corresponding to at least one other SSB group based on the information about the SSB group, and receiving, from the base station, at least one SSB belonging to the at least one other SSB group based on the second frequency domain.

According to an embodiment of the disclosure, a transmission and reception method of a base station in a wireless communication system may include identifying a synchronization signal block (SSB) group to which a plurality of SSBs belong, the each SSB group being related to a different frequency domain, performing resource mapping of the plurality of SSBs including information about the SSB group to which the SSBs belong based on the frequency domain corresponding to the SSB group to which the SSBs belong, and transmitting the plurality of SSBs including the information about the SSB group to which the SSBs belong on the mapped resource.

According to an embodiment of the disclosure, a UE in a wireless communication system may include a transceiver, and a controller configured to receive a synchronization signal block (SSB) from a base station based on blind detection, identify information about an SSB group to which the SSB belongs based on the received SSB, the SSB group being related to a first frequency domain, identify a second frequency domain corresponding to at least one other SSB group based on the information about the SSB group, and control to receive, from the base station, at least one SSB belonging to the at least one other SSB group based on the second frequency domain.

According to an embodiment of the disclosure, a base station in a wireless communication system may include a transceiver, and a controller configured to identify a synchronization signal block (SSB) group to which a plurality of SSBs belong, the each SSB group being related to a different frequency domain, perform resource mapping of the plurality of SSBs including information about the SSB group to which the SSBs belong based on the frequency domain corresponding to the SSB group to which the SSBs belong, and control to transmit the plurality of SSBs including the information about the SSB group to which the SSBs belong on the mapped resource.

Advantageous Effects of Invention

According to an embodiment of the disclosure, it is possible to effectively reduce the beam sweeping resource overhead for operating the SSB in the terahertz band of the wireless communication.

Effects that can be obtained in the disclosure are not limited to the above-described effects, and other unmentioned effects will be able to be clearly understood by those of ordinary skill in the art to which the disclosure pertains.

BRIEF DESCRIPTION OF DRAWINGS

FIG. 10A is a diagram explaining an operation of a base station in case that the number $L_F$ of Frequency Domain Multiplexed SSBs can be variously configured according to an embodiment of the disclosure.

MODE FOR THE INVENTION

Figure 1:
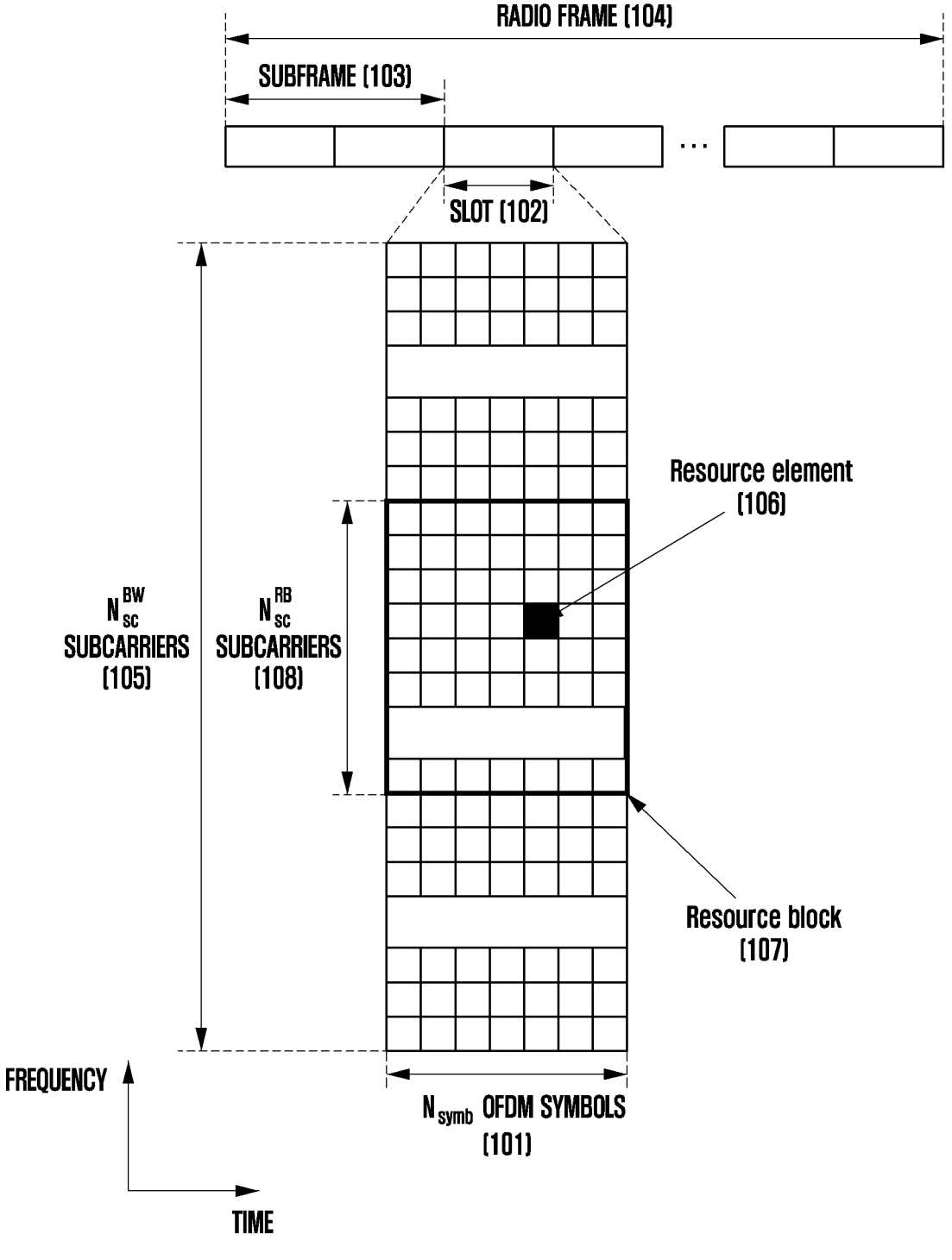
FIG. 1 is a diagram illustrating the basic structure of a time-frequency domain in LTE.

Hereinafter, preferred embodiments of the disclosure will be described in detail with reference to the accompanying drawings. In this case, it is to be noted that if possible, the same constituent elements are denoted by the same reference numerals in the accompanying drawings. Further, detailed explanation of the known functions and constitutions that may obscure the subject matter of the disclosure will be omitted.

In describing the embodiments in the description, explanation of technical contents that are well known in the technical field to which the disclosure pertains and are not directly related to the disclosure may be omitted. This is to transfer the subject matter of the disclosure more clearly without obscuring the same through omission of unnecessary explanations.

For the same reason, in the accompanying drawings, some constituent elements are exaggerated, omitted, or briefly illustrated. Further, sizes of the respective constituent elements do not completely reflect the actual sizes thereof, and in the drawings, the same reference numerals are used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The embodiments are provided to complete the disclosure and to completely notify those of ordinary skill in the art to which the disclosure pertains of the category of the disclosure, and the disclosure is only defined within the scope of the appended claims. In the entire description of the disclosure, the same reference numerals are referred to as the same constituent elements.

In this case, it will be understood that each block of the flowchart illustrations, and combinations of blocks in the flowchart illustrations, can be performed by computer program instructions. These computer program instructions can be loaded to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions can also be stored in a computer usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions which are executed on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, and performs certain tasks. However, "unit" is not meant to be limited to software or hardware. The term "unit" may be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "—units" or further separated into additional components and "units". Further, the components and "units" may be implemented to operate one or more CPUs in a device or a security multimedia card.

In describing the embodiments of the disclosure in detail, although being aimed at 6G mobile communication technology after the 5G mobile communication, the main subject matter of the disclosure can be applied even to other communication systems having the similar technical backgrounds through slight modification thereof within the range that does not greatly deviate from the range of the disclosure, and this will be able to be possible by the judgment of those skilled in the art to which the disclosure pertains.

Hereinafter, for convenience in explanation, some of the terms and names defined in the 3rd generation partnership project long term evolution (3GPP LTE) standards (standards for the 5G, NR, LTE, or similar systems) may be used in the disclosure. However, the disclosure is not restricted by the terms and names, and it may be equally applied to systems complying with other standards.

In the following description, a term to denote a signal being used, a term to denote control information, a term to denote network entities, and a term to denote constituent elements of a device have been exemplified for convenience in explanation. Accordingly, the disclosure is not limited to the terms used in the disclosure, and other terms to denote targets having equivalent technical meanings may be used.

In the following description, a physical channel and a signal may be used interchangeably with data or a control signal. For example, although a physical downlink shared channel (PDSCH) is the term to denote a physical channel on which data is transmitted, the PDSCH may be used to denote the data. That is, in the disclosure, the expression "transmit a physical channel" may be interpreted equivalently to the expression "transmit data or a signal through a physical channel".

Hereinafter, in the disclosure, upper signaling means a method for transferring a signal from a base station to a UE by using a downlink data channel of a physical layer, or transferring the signal from the UE to the base station by using an uplink data channel of the physical layer. The upper signaling may be understood as radio resource control (RRC) signaling or media access control (MAC) control element (CE).

Further, in the disclosure, although the expression "more than" or "less than" is used to determine whether to satisfy or fulfill a specific condition, this is merely exemplary, and does not exclude the description "equal to or more than" or "equal to or less than" The condition described as "equal to or more than" may be replaced by "more than", the condition described as "equal to or less than" may be replaced by "less than", and the condition described as "equal to or more than and less than" may be replaced by "more than and equal to or less than".

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-Advanced (LTE-A), LTE-Pro, 3GPP2 high rate packet data (HRPD), ultra mobile broadband (UMB), and IEEE 802.16e.

In the LTE system that is a representative example of the broadband wireless communication systems, a downlink (DL) adopts an orthogonal frequency division multiplexing (OFDM) scheme, and an uplink (UL) adopts a single carrier frequency division multiple access (SC-FDMA) scheme. The uplink means a radio link in which a user equipment (UE) or a mobile station (MS) transmits data or a control signal to a base station (eNode B or BS), and the downlink means a radio link in which the base station transmits data or a control signal to the UE. According to the above-described multiple access schemes, generally, data or control information for each user is discriminated from each other by performing an allocation and an operation so as to prevent the time-frequency resources for carrying the data or control information for each user from overlapping each other, that is, to establish orthogonality.

In the 5G communication system that is beyond the LTE, since it is necessary to freely reflect various requirements of users and service providers, services simultaneously satisfying the various requirements should be supported. Services being considered for the 5G communication system are enhanced mobile broadband (eMBB), massive machine type communication (mMTC), and ultra-reliability low-latency communication (URLLC).

The eMBB may aim at providing of more improved data rate than the data rate supported by the existing LTE, LTE-A, or LTE-Pro. For example, in the 5G communication system, it is required that, from the viewpoint of one base station, the eMBB provide a peak data rate of 20 Gbps on the downlink and a peak data rate of 10 Gbps on the uplink. Further, the 5G communication system should provide a user perceived data rate of increased UEs simultaneously with providing the peak data rate. In order to satisfy such requirements, improvement of various transmission/reception technologies including more improved multi input multi output (MIMO) transmission technology is required. Further, in the 5G system, it becomes possible to satisfy the data rate required in the 5G communication system by using a frequency bandwidth that is wider than 20 MHz in the frequency band of 3 to 6 GHz or 6 GHz or more whereas in the LTE, signal transmission is performed using the maximum transmission bandwidth of 20 MHz in the 2 GHz band used in the LTE.

At the same time, in order to support application services, such as Internet of things (IoT), in the 5G communication system, the mMTC is under consideration. In order to efficiently provide the Internet of things in the mMTC, massive UE access support, UE coverage improvement, improved battery time, and UE cost reduction are required in a cell. Since the Internet of things is attached to various sensors and appliances to provide communication functions, it should support a large number of UEs (e.g., 1,000,000 UEs/km$^2$) in the cell. Further, since there is a high possibility that a UE supporting the mMTC is located in a shaded area that is unable to be covered by the cell, such as underground of a building, due to the characteristics of the service, a wider coverage is demanded as compared with other services being provided by the 5G communication system. The UE supporting the mMTC should be configured as an inexpensive UE, and since it is difficult to frequently replace a battery of the UE, a very long battery life time, such as 10 to 15 years, is required.

Last, the URLLC is a cellular-based wireless communication service that is used for a specific purpose (mission-critical). For example, services used for remote control of a robot or machinery, industrial automation, unmanned aerial vehicle, remote health care, and emergency alert may be considered. Accordingly, the communication being provided by the URLLC should provide a very low latency and a very high reliability. For example, a service supporting the URLLC should satisfy an air interface latency that is shorter than 0.5 milliseconds and has packet error rate requirements of 10$^{-5}$ or less at the same time. Accordingly, for the service supporting the URLLC, the 5G system should provide a transmit time interval (TTI) that is shorter than that of other services, and it requires design matters to allocate wide resources in the frequency band in order to secure reliability of a communication link at the same time.

Three kinds of services in the 5G, that is, the eMBB, URLLC, and mMTC may be multiplexed and transmitted by one system. In this case, in order to satisfy different requirements of the respective services, different transmission/reception techniques and transmission/reception parameters may be used between the services.

Hereinafter, a frame structure of LTE and LTE-A systems will be described in more detail with reference to the drawings.

FIG. 1 is a diagram illustrating the basic structure of a time-frequency domain that is a radio resource area in which the data or control channel is transmitted in LTE.

In FIG. 1, a horizontal axis represents a time domain, and a vertical axis represents a frequency domain. The minimum transmission unit in the time domain is an OFDM symbol, and N$_{symb}$ (101) OFDM symbols are gathered to constitute one slot 102, and two slots are gathered to constitute one subframe 103. The length of the slot is 0.5 ms, and the length of the subframe is 1.0 ms. Further, a radio frame 104 is a time domain unit composed of 10 subframes. The minimum transmission unit in the frequency domain is a subcarrier, and the bandwidth of the overall system transmission band is composed of total N$_{BW}$ (105) subcarriers. In the time-frequency domain, the basic resource unit is a resource element (RE) 106, and may be represented as an OFDM symbol index and a subcarrier index. A resource block (RB) (or physical resource block (PRB)) 107 is defined as N$_{symb}$ (101) successive OFDM symbols in the time domain and N$_{RB}$ (108) successive subcarriers in the frequency domain. Accordingly, one RB (108) is composed of N$_{symb}$×N$_{RB}$ REs (106). In general, the minimum transmission unit of data is the unit of the RB, and in the LTE system, it is general that N$_{symb}$=7 and N$_{RB}$=12, and N$_{BW}$ is in proportion to the bandwidth of the system transmission band.

Next, downlink control information (DCI) in the LTE and LTE-A systems will be described in detail.

In the LTE system, scheduling information on downlink data or uplink data is transferred from a base station to a UE through DCI. The DCI defines several formats, and the determined DCI formation is applied and operated depending on whether the scheduling information is for the uplink data or the downlink data, whether the DCI is compact DCI having a small size of control information, whether to apply spatial multiplexing using multiple antennas, and whether the DCI is for power control. For example, DCI format 1 that is scheduling control information on the downlink data is configured to include at least the following control information.

Resource allocation type 0/1 flag: This notifies whether a resource allocation type is type 0 or type 1. The type 0 allocates a resource in a resource block group (RBG) unit by applying a bitmap method. In the LTE system, the basic scheduling unit is a resource block (RB) that is expressed as time and resource area resources, and an RBG is composed of a plurality of RBs, and becomes the basic scheduling unit in type 0. The type 1 allocates a specific RB within the RBG.

Resource block assignment: This notifies of an RB allocated to data transmission. The resource being expressed is determined in accordance with the system bandwidth and the resource allocation type.

Modulation and coding scheme (MCS): This notifies of a modulation type used for data transmission and the size of a transport block that is data to be transmitted.

HARQ process number: This notifies of a process number of HARQ.

New data indicator: This notifies of whether the transmission is an HARQ initial transmission or retransmission.

Redundancy version: This notifies of an HARQ redundancy version.

Transmit power control (TPC) command for physical uplink control channel (PUCCH): This notifies of a transmit power control command for PUCCH that is an uplink control channel.

The DCI passes through the channel coding and modulation process, and is transmitted on a physical downlink control channel (PDCCH) that is a downlink physical control channel.

A cyclic redundancy check (CRC) is attached to a DCI message payload, and the CRC is scrambled with a radio network temporary identifier (RNTI) corresponding to the identity of the UE. Different RNTIs are used depending on the purpose of a DCI message, for example, UE-specific data transmission, power control command or random access response. That is, the RNTI is not explicitly transmitted, but is included in a CRC calculation process and is transmitted. If the DCI message being transmitted on the PDCCH is received, the UE identifies the CRC by using the allocated RNTI, and if the CRC identification result is correct, it can be known that the corresponding message has been transmitted to the UE.

Figure 2:
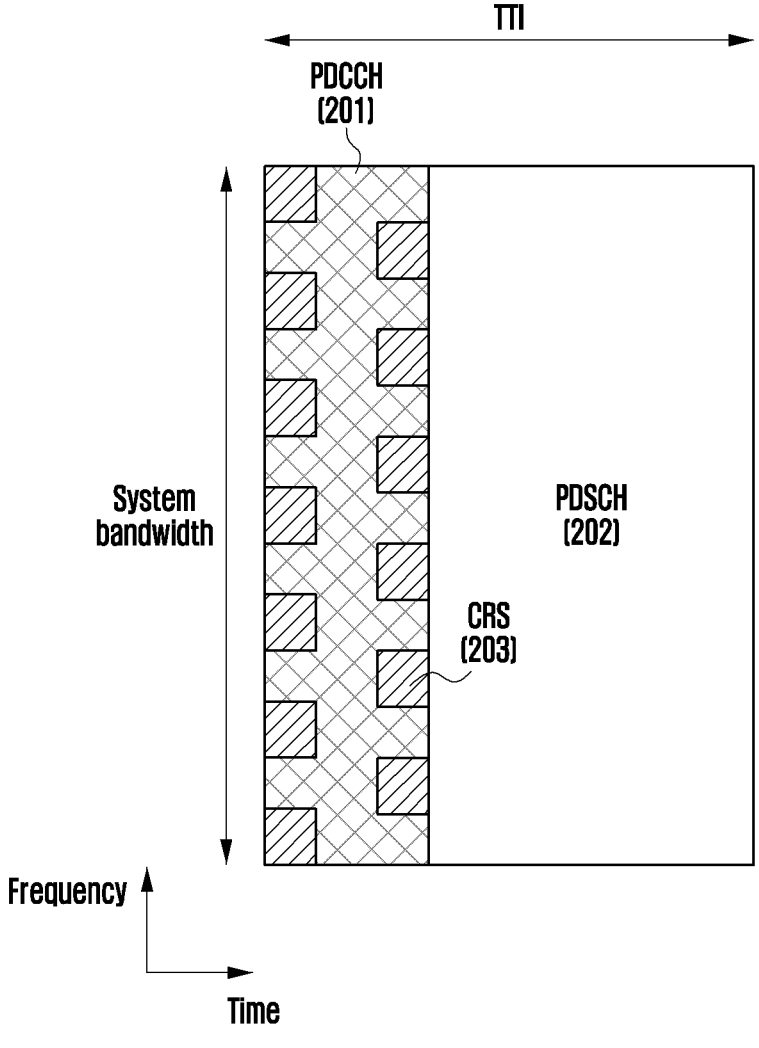
FIG. 2 is a diagram illustrating a downlink control channel of LTE.

FIG. 2 is a diagram illustrating PDCCH 201 that is a downlink physical channel on which DCI of the LTE is transmitted.

According to FIG. 2, the PDCCH 201 is time-multiplexed with a PDSCH 202 that is a data transmission channel, and is transmitted over the entire system bandwidth. The area of the PDCCH 201 is expressed by the number of OFDM symbols, and this is indicated to a UE as a control format indicator (CFI) that is transmitted through a physical control format indicator channel (PCFICH). By allocating the PDCCH 201 to an OFDM symbol that comes to a front part of a subframe, the UE can decode the downlink scheduling allocation as soon as possible, and through this, it is possible to reduce the decoding delay for the downlink shared channel (DL-SCH), that is, the entire downlink transmission delay. Since one PDCCH can carry one DCI message, and a plurality of UEs can be simultaneously scheduled to the downlink and the uplink, transmission of a plurality of PDCCHs is simultaneously performed in each cell. As a reference signal for decoding the PDCCH 201, a cell-specific reference signal (CRS) 203 is used. The CRS 203 is transmitted every subframe across the whole band, and scrambling and resource mapping differ in accordance with a cell identity (ID). Since the CRS 203 is a reference signal commonly used by all UEs, the UE-specific beamforming is unable to be used. Accordingly, the multi-antenna transmission techniques for the PDCCH of the LTE is limited to open-loop transmit diversity. The number of CRS ports is implicitly known to the UE through decoding of a physical broadcast channel (PBCH).

The resource allocation of the PDCCH 201 is based on a control-channel element (CCE), and one CCE is composed of 9 resource element groups (REGs), that is, total 36 resource elements (REs). The number of CCEs required for the specific PDCCH 201 may be 1, 2, 4, or 8, and may differ depending on the channel coding rate of a DCI message payload. The different numbers of CCEs as described above are used to implement link adaptation of the PDCCH 201. The UE should detect a signal in a state where it does not know the information on the PDCCH 201, and thus, in the LTE, a search space that represents a set of CCEs for blind decoding has been defined. The search space is composed of a plurality of sets at each CCE aggregation level (AL), and the search space is not explicitly signaled, but may be implicitly defined through a function by a UE identity and the subframe number. In each subframe, the UE performs decoding of the PDCCH 201 with respect to all possible resource candidates that can be made from the CCEs in the configured search space, and processes information declared as valid to the corresponding UE through the CRC identification.

The search space is classified into a UE-specific search space and a common search space. The UEs in the certain group or all UEs may check the common search space of the PDCCH 201 in order to receive cell-common control information, such as dynamic scheduling for system information or paging message. For example, the UE may receive the DL-SCH scheduling allocation information for transmission of system information block (SIB)-1 including service provider information of the cell by checking the common search space of the PDCCH 201.

In the LTE, the entire PDCCH area is composed of a set of CCEs in a logical area, and the search space composed of the set of CCEs exists. The search space is divided into a common search space and a UE-specific search space, and the search space for the LTE PDCCH is defined as in Table 1 below.

TABLE 1

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L \{(Y_k + m') \bmod \lfloor N_{CCE,k}/L \rfloor\} + i$$

where $Y_k$ is defined below, $i = 0, \ldots, L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \ldots, M^{(L)} - 1$. $M^{(L)}$ is the number of PDCCH candidates to monitor in the given search space.

TABLE 1-continued

Note that the carrier indicator field value is the same as ServCellIndex
For the common search spaces, $Y_k$ is set to 0 for the two aggregation levels L = 4
and L = 8.
For the UE-specific search space $S_k^{(L)}$ at aggregation level$_L$, the variable $Y_k$ is
defined by $$Y_k = ( A \cdot Y_{k-1}) \bmod D$$

where $Y_{-1} = n_{RNTI} \neq 0$, A = 39827 , D = 65537 and k = $\lfloor n_s/2 \rfloor$, $n_s$ is the slot
number within a radio frame.
The RNTI value used for $n_{RNTI}$ is defined in subclause 7.1 in downlink and
subclause 8 in uplink.

According to the definition of the search space for the PDCCH as described above, the UE-specific search space is not explicitly signaled, and is implicitly defined through a function by a UE identity and a subframe number. In other words, the UE-specific search space may be changed in accordance with the subframe number, and this means that the UE-specific search space may be changed according to time, and through this, it is possible to solve a problem (blocking problem) in that a specific UE is unable to use the search space by other UEs among UEs. If all CCEs being checked by a certain UE have already been used by other UEs scheduled in the same subframe, and thus the specific UE is unable to be scheduled in the corresponding subframe, the search space is changed according to time, and thus such a problem may not occur in the next subframe. For example, even if parts of the UE-specific search spaces of UE #1 and UE #2 overlap each other, the UE-specific search space is changed for each subframe, and thus it can be expected that the overlapping in the next subframe differs from that in the corresponding subframe. According to the definition of the search space for the PDCCH as described above, the UEs of a specific group or all UEs should receive the PDCCH in case of the common search space, and thus the common search space is defined as a pre-engaged set of CCEs. In other words, the common search space is not changed in accordance with the identity of the UE or the subframe number. Although the common search space exists for transmission of various system messages, it may also be used to transmit control information of an individual UE. Through this, the common search space may also be used as a solution for the phenomenon that the UE is unable to be scheduled due to lack of available resources in the UE-specific search space.

The search space is a set of candidate control channels composed of the CCEs that the UE should attempt to perform decoding at a given aggregation level, and since there are several aggregation levels to make a bundle of 1, 2, 4, or 8 CCEs, the UE has a plurality of search spaces. On the LTE PDCCH, the number of PDCCH candidates that should be monitored by the UE in the search space defined in accordance with the aggregation level is defined as in Table 2 below.

TABLE 2

| Type | Search space $S_k^{(L)}$ | | |
| | Aggregation level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |

TABLE 2-continued

| Type | Search space $S_k^{(L)}$ | | |
| | Aggregation level L | Size [in CCEs] | Number of PDCCH candidates $M^{(L)}$ |
| --- | --- | --- | --- |
| Common | 4 | 16 | 4 |
| | 8 | 16 | 2 |

According to Table 2 above, in case of the UE-specific search space, the UE supports the aggregation level $\{1, 2, 4, 8\}$, and in this case, the UE has $\{6, 6, 2, 2\}$-numbered PDCCH candidates. In case of the common search space, the UE supports the aggregation level $\{4, 8\}$, and in this case, the UE has $\{4, 2\}$-numbered PDCCH candidates. The reason why the common search space supports only the aggregation level $\{4, 8\}$ is to improve coverage characteristics since a system message should generally reach the cell edge. The DCI that is transmitted to the common search space is defined only with respect to a specific DCI format, such as 0/1A/3/3A/1C, corresponding to the purpose of power control for the system message or the UE group. In the common search space, the DCI format having spatial multiplexing is not supported. The downlink DCI format that should be decoded in the UE-specific search space differs depending on a transmission mode configured with respect to the corresponding UE. Since the configuration of the transmission mode is performed through radio resource control (RRC) signaling, an accurate subframe number corresponding to whether the corresponding configuration takes effect on the corresponding UE has not been designated. Accordingly, the UE can operate so as not to lose communication by always performing decoding with respect to the DCI format 1A regardless of the transmission mode.

As described above, the method for transmitting and receiving the downlink control channel and the downlink control information and the search space in the conventional LTE and LTE-A have been described.

Hereinafter, the downlink control channel in the 5G communication system being currently discussed will be described in more detail with reference to the drawings.

Figure 3:
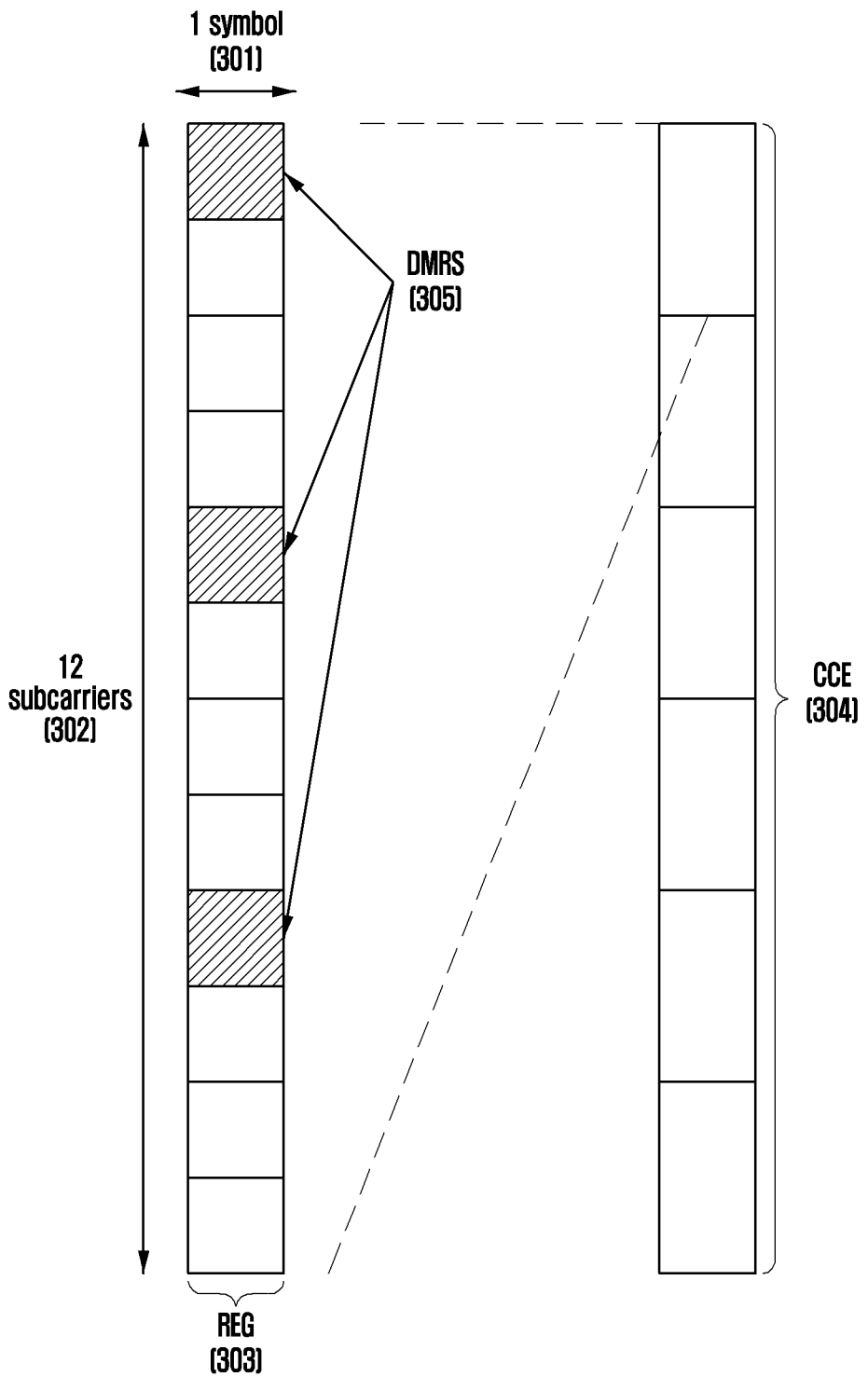
FIG. 3 is a diagram illustrating transmission resources of a downlink control channel in 5G.

FIG. 3 is a diagram showing an example of a basic unit of time and frequency resources constituting a downlink control channel that can be used in 5G. According to FIG. 3, the basic unit REG of time and frequency resources constituting a control channel is composed of 1 OFDM symbol 301 on the time axis, and 12 subcarriers 302, that is, 1 RB, on the frequency axis. By assuming that the time-axis basic unit is 1 OFDM symbol 301 in constituting the basic unit of the control channel, a data channel and a control channel may be time-multiplexed in one subframe. By locating the control channel in front of the data channel, user's processing time can be reduced, and thus it is easy to satisfy latency requirements. By configuring the frequency-axis basic unit of the control channel to 1 RB 302, the frequency multiplexing between the control channel and the data channel may be performed more efficiently.

A control channel resource set of various sizes may be configured by concatenating REG 303 illustrated in FIG. 3. As an example, if it is assumed that the basic unit to which the downlink control channel is allocated in the 5G is CCE 304, 1 CCE 304 may be composed of a plurality of REGs 303. In case of exemplifying the REG 304 illustrated in FIG. 3, if the REG 303 may be composed of 12 REs, and 1 CCE 304 is composed of 6 REGs 303, it means that 1 CCE 304 may be composed of 72 REs. If the downlink control resource set is configured, the corresponding set may be composed of a plurality of CCEs 304, and a specific downlink control channel may be mapped onto one or a plurality of CCEs 304 to be transmitted in accordance with the aggregation level (AL) in the control resource set. The CCEs 304 in the control resource set may be discriminated by their numbers, and in this case, the number may be given in accordance with a logical mapping method.

The basic unit of the downlink control channel illustrated in FIG. 3, that is, the REG 303, may include all of REs onto which the DCI is mapped and an area onto which a demodulation reference signal (DMRS) 305 that is a reference signal for decoding the REs is mapped. As illustrated in FIG. 3, the DMRS 305 may be transmitted in six REs in one REG 303. For reference, since the DMRS 303 is transmitted by using precoding, such as a mapped control signal in the REG 303, the UE can decode the control information even without information on which precoding the base station applies.

Figure 4:
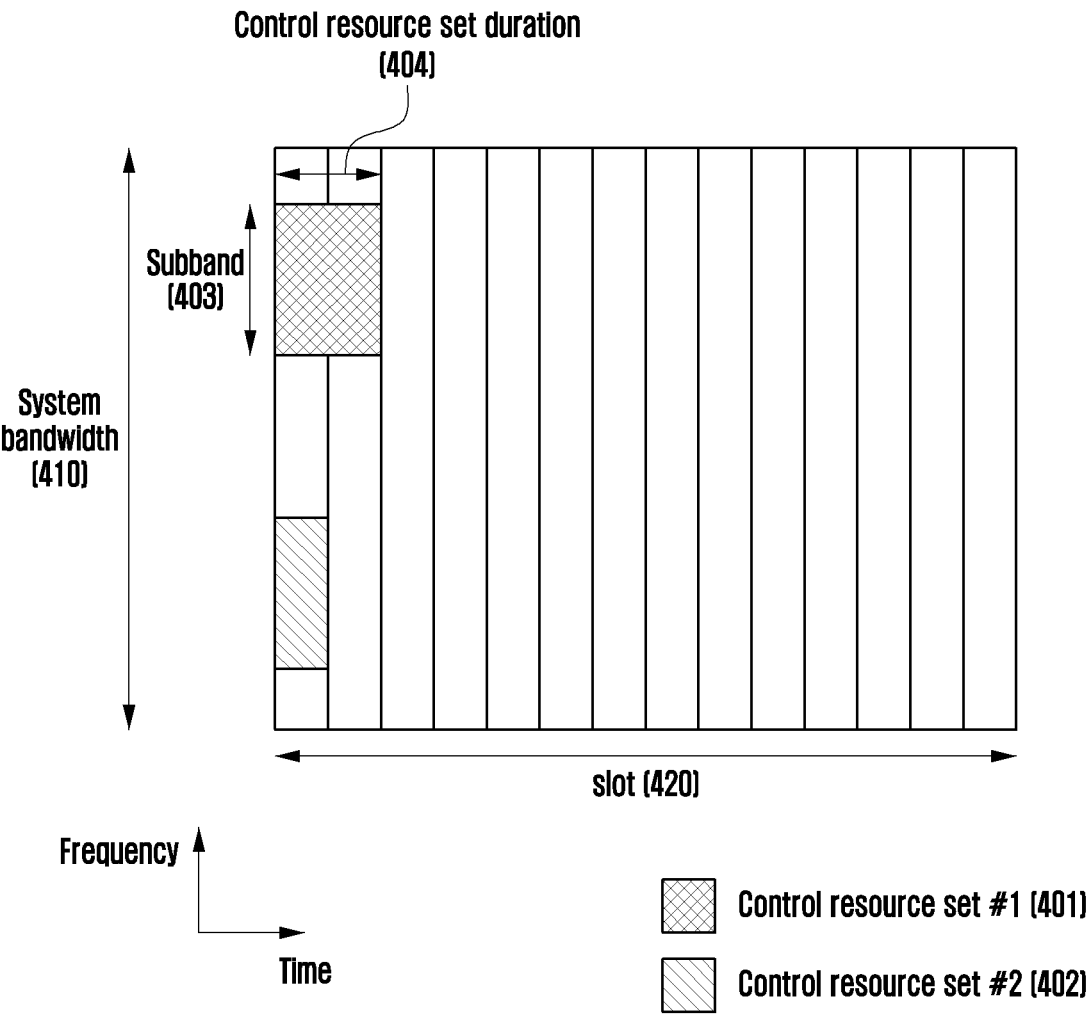
FIG. 4 is a diagram illustrating an example of a configuration for a control resource set in 5G.

FIG. 4 is a diagram illustrating an example of a control resource set (CORESET) in which a downlink control channel is transmitted in a 5G wireless communication system. FIG. 4 illustrates an example in which a system bandwidth 410 is configured on the frequency axis, and two control resource sets (control resource set #1 401 and control resource set #2 402) are configured in one slot 420 (it is assumed that one slot corresponds to 14 OFDM symbols in an example of FIG. 4) on the time axis. The control resource sets 401 and 402 may be configured as a specific subband 403 in the entire system bandwidth 410 on the frequency axis. On the time axis, one or a plurality of OFDM symbols may be configured, and this may be defined as a control resource set duration 404. In an example of FIG. 4, the control resource set #1 401 is configured as the control resource set duration of two symbols, and the control resource set #2 402 is configured as the control resource set duration of one symbol.

The control resource set in the 5G as described above may be configured by the base station to the UE through upper layer signaling (e.g., system information, master information block (MIB), and RRC signaling). Configuring of the control resource set to the UE means providing of information, such as location of the control resource set, subband, resource allocation of the control resource set, and control resource set duration. For example, the following information may be included.

TABLE 3

Configuration information 1. Frequency-axis RB allocation information
Configuration information 2. Control resource set start symbol
Configuration information 3. Control resource set symbol length
Configuration information 4. REG bundling size (2 or 3 or 6)
Configuration information 5. Transmission mode (interleaved transmission method or non-interleaved transmission method)
Configuration information 6. DMRS configuration information (this may be precoder granularity-related information)
Configuration information 7. Search space type (common search space,

TABLE 3-continued group-common search space, and UE-specific search space)
Configuration information 8. DCI format to be monitored in the corresponding control resource set
-Others In addition to the above configuration information, various pieces of information needed to transmit the downlink control channel may be configured to the UE. Next, the downlink control information (DCI) in the 5G will be described in detail. In the 5G, scheduling information on uplink data (physical uplink shared channel (PUSCH)) or downlink data (physical downlink shared channel (PDSCH)) is transferred from the base station to the UE through the DCI. The UE may monitor a fallback DCI format and a non-fallback DCI format with respect to the PUSCH or PDSCH. The fallback DCI format may be configured as a fixed field between the base station and the UE, and the non-fallback DCI formation may include a configurable field.

The fallback DCI that schedules the PUSCH may include, for example, the following information.

TABLE 4

Identifier for DCI formats-[1] bit
Frequency domain resource assignment-
$[\lceil \log_2 (N_{RB}^{UL,\ BWP}(N_{RB}^{UL,\ BWP} + 1)/2)\ \rceil]$ bits
Time domain resource assignment-X bits
Frequency hopping flag-1 bit.
Modulation and coding scheme-[5] bits
New data indicator-1 bit
Redundancy version-[2] bits
HARQ process number-[4] bits
TPC command for scheduled PUSCH-[2] bits
-UL/SUL indicator - 0 or 1 bit The non-fallback DCI that schedules the PUSCH may include, for example, the following information.

TABLE 5

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{UL,\ BWP}/P \rceil$ bits
For resource allocation type 1, $\lceil \log_2(N_{RB}^{UL,\ BWP} (N_{RB}^{UL,\ BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits as defined in section x.x of [6, TS38.214]
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK subcodebooks;
0 bit otherwise.
TPC command for scheduled PUSCH - 2 bits
SRS resource indicator $-\left\lceil \log_2\left(\sum_{k=1}^{L_{max}} \binom{N_{SRS}}{k}\right)\right\rceil$ or $\lceil \log_2(N_{SRS})\rceil$ bits TABLE 5-continued $$\left\lceil \log_2 \left( \sum_{k=1}^{L_{max}} \binom{N_{SRS}}{k} \right) \right\rceil \text{ bits for non-codebook based PUSCH}$$

transmission;
$\lceil \log_2(N_{SRS}) \rceil$ bits for codebook PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit The fallback DCI that schedules the PDSCH may include, for example, the following information.

TABLE 6

Identifier for DCI formats-[1] bit
Frequency domain resource assignment-
$\lceil \log_2 (N_{RB}^{DL, BWP}(N_{RB}^{DL, BWP} + 1)/2) \rceil$ bits
Time domain resource assignment-X bits
VRB-to-PRB mapping-1 bit.
Modulation and coding scheme-[5] bits
New data indicator-1 bit
Redundancy version-[2] bits
HARQ process number-[4] bits
Downlink assignment index-2 bits
TPC command for scheduled PUCCH-[2] bits
PUCCH resource indicator-[2] bits
-PDSCH-to-HARQ feedback timing indicator-[3] bits The non-fallback DCI that schedules the PDSCH may include, for example, the following information.

TABLE 7

Carrier indicator-0 or 3 bits
Identifier for DCI formats-[1] bits
Bandwidth part indicator-0, 1 or 2 bits
Frequency domain resource assignment
For resource allocation type 0, $\lceil (N_{RB}^{DL, BWP}/P \rceil$ bits
For resource allocation type 1,
$\lceil \log_2 (N_{RB}^{DL, BWP}(N_{RB}^{DL, BWP} + 1)/2) \rceil$ bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
PRB bundling size indicator-1 bit
Rate matching indicator-0, 1, 2 bits
ZP CSI-RS trigger-X bits
For transport block 1:
Modulation and coding scheme-5 bits
New data indicator-1 bit
Redundancy version-2 bits
For transport block 2:
Modulation and coding scheme-5 bits
New data indicator-1 bit
Redundancy version-2 bits
HARQ process number-4 bits
Downlink assignment index-0 or 4 bits
TPC command for scheduled PUCCH-2 bits
PUCCH resource indicator
PDSCH-to-HARQ feedback timing indicator-3 bits
Antenna ports-up to 5 bits
Transmission configuration indication-3 bits
SRS request-2 bits
CBG transmission information-0, 2, 4, 6, or 8 bits
CBG flushing out information-0 or 1 bit
-DMRS sequence initialization-0 or 1 bit The DCI may be transmitted on the physical downlink control channel (PDCCH) through a channel coding and modulation process. The cyclic redundancy check (CRC) is attached to the DCI message payload, and the CRC is scrambled with a radio network temporary identifier (RNTI) corresponding to the identity of the UE. Different RNTIs are used depending on the purpose of the DCI message, for example, UE-specific data transmission, power control command, or random access response. That is, the RNTI is not explicitly transmitted, but is included in a CRC calculation process and is transmitted. If the DCI message being transmitted on the PDCCH is received, the UE identifies the CRC by using the allocated RNTI, and if the CRC identification result is correct, the UE can know that the corresponding message has been transmitted to the UE. For example, the DCI that schedules the PDSCH for the system information (SI) may be scrambled with SI-RNTI. The DCI that schedules the PDSCH for a random access response (RAR) message may be scrambled with RA-RNTI. The DCI that schedules the PDSCH for a paging message may be scrambled with P-RNTI. The DCI that notifies of a slot format indicator (SFI) may be scrambled with SFI-RNTI. The DCI that notifies of the transmit power control (TPC) may be scrambled with TPC-RNTI. The DCI that schedules the UE-specific PDSCH or PUSCH may be scrambled with cell RNTI (C-RNTI).

Figure 5:
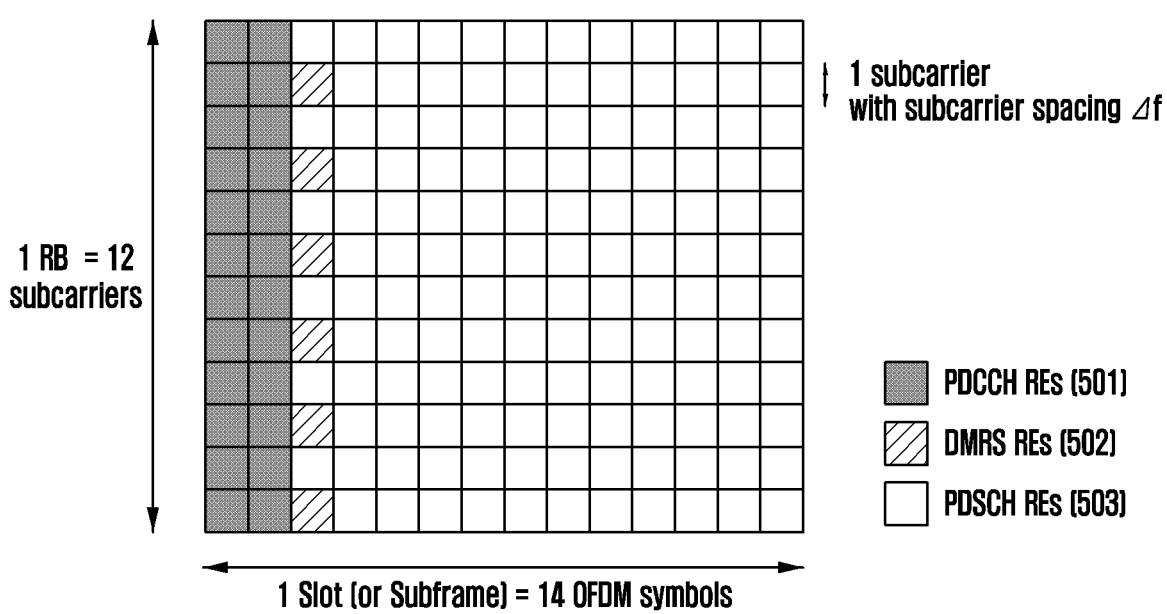
FIG. 5 is a diagram illustrating an example of a configuration for a downlink RB structure in 5G.

If a specific UE is scheduled with a data channel, that is, PUSCH or PDSCH, through the PDCCH, data in the corresponding scheduled resource set is transmitted or received together with the DMRS. FIG. 5 illustrates a case in which a specific UE is configured to use 14 OFDM symbols as one slot (or subframe) in the downlink, transmit (501) the PDCCH in two initial OFDM symbols, and transmit (502) the DMRS in the third symbol. In case of FIG. 5, in the specific RB scheduled with the PDSCH, the data is mapped onto REs that do not transmit the DMRS in the third symbol and REs from the fourth symbol to the last symbol to be transmitted (503). As the subcarrier spacing Δf expressed in FIG. 5, 15 kHz is used in case of the LTE and LTE-A system, and one of {15, 30, 60, 120, 240, 480} kHz is used in case of the 5G system.

Meanwhile, in order to measure the downlink channel state in a cellular system as described above, the base station should transmit a reference signal. In case of the 3GPP long term evolution advanced (LTE-A) system, the UE may measure the channel state between the base station and the UE by using the CRS or CSI-RS that is transmitted by the base station. The channel state should be measured in consideration of various elements, and interference in the downlink may be included therein. The interference in the downlink includes an interference signal and thermal noise generated by an antenna belonging to an adjacent base station, and is important for the UE to judge the channel situation of the downlink. As an example, in case that an individual base station having one transmission antenna transmits a signal to a UE having one reception antenna, the UE should determine Es/Io by judging the interferences to be simultaneously received in a section in which energy per symbol that can be received on the downlink from the reference signal received from the base station and the corresponding symbol are received. The determined Es/Io is converted into a data transmission speed or the corresponding value and is transmitted to the base station in the form of a channel quality indicator (CQI), and may be used to judge at what data transmission speed the base station is to perform the transmission with respect to the UE.

In case of the LTE-A system, the UE feeds the information about the downlink channel state back to the base station so as to utilize the information for the downlink scheduling of the base station. That is, the UE measures the reference signal being transmitted by the base station on the downlink, and feeds the information extracted therefrom back to the base station in the form that is defined in the LTE/LTE-A standards. As described above, the information fed back by the UE in the LTE/LTE-A may be called channel state information, and the channel state information may include the following three kinds of information.

Rank indicator (RI): The number of spatial layers that the UE can receive in the current channel state Precoding matrix indicator (PMI): An indicator for a precoding matrix that the UE prefers in the current channel state Channel quality indicator (CQI): The maximum data rate at which the UE can receive data in the current channel state The CQI may be replaced by the signal to interference plus noise ratio (SINR) that can be utilized in a similar manner to that of the maximum data rate, the maximum error correction code rate and modulation scheme, or data efficiency per frequency.

The RI, PMI, and CQI have meanings in relation to one another. As an example, a precoding matrix that is supported in the LTE/LTE-A is differently defined for each rank. Accordingly, the PMI value X when the RI has the value of 1 and the PMI value X when the RI has the value of 2 are differently interpreted. Further, even in case of determining the CQI, the UE assumes that the PMI and X that the UE itself has notified the base station have been applied in the base station. That is, the UE's report of RI_X, PMI_Y, and CQI_Z to the base station is the same as the report in that the corresponding UE can receive the data rate corresponding to the CQI_Z in case of configuring the rank as RI_X and configuring the PMI as PMI_Y. As described above, the UE assumes what transmission scheme the UE is to perform with respect to the base station when calculating the CQI, and obtains the optimized performance when performing the actual transmission in the corresponding transmission scheme.

In the LTE/LTE-A, the RI, PMI, and CQI that are the channel state information being fed back by the UE may be fed back in a periodic or aperiodic form. If the base station intends to aperiodically obtain the channel state information of a specific UE, the base station may configure to perform an aperiodic feedback (or aperiodic channel state information report) by using an aperiodic feedback indicator (or channel state information request field or channel state information request information) included in the downlink control information (DCI) for the UE. Further, if the UE receives the indicator configured to perform the aperiodic feedback in the n-th subframe, the UE may perform the uplink transmission by including the aperiodic feedback information (or channel state information) in the data transmission in the (n+k)-th subframe. Here, k is a parameter defined in the 3GPP LTE Release 11 standards, and is 4 in frequency division duplexing (FDD), and may be defined as in Table 8 below in time division duplexing (TDD).

TABLE 8

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — | k value for each subframe number n in TDD UL/DL configuration

In case that the aperiodic feedback is configured, the feedback information (or channel state information) may include the RI, PMI, and CQI, and the RI and PMI may not be fed back in accordance with the feedback configuration (or channel state report configuration).

In various embodiments of the disclosure, a synchronization signal block (SSB) operation method of a base station/UE for wireless communication in the terahertz (THz) band is proposed. Various embodiments of the disclosure may include a scheme for a base station to transmit a frequency division multiplexed (FDM-multiplexed) signal between SSBs on the downlink, and a scheme for a UE to detect the SSBs. Further, various embodiments of the disclosure may include a scheme for a base station to transmit information about the number/size of the FDM-multiplexed SSBS when operating the several possible number of FDM-multiplexed SSBs, and a scheme for a UE to detect the corresponding information. According to various embodiments of the disclosure, operations being described in at least one of drawings illustrated below may be performed together in a range where the operations are not interfered with one another.

Figure 6:
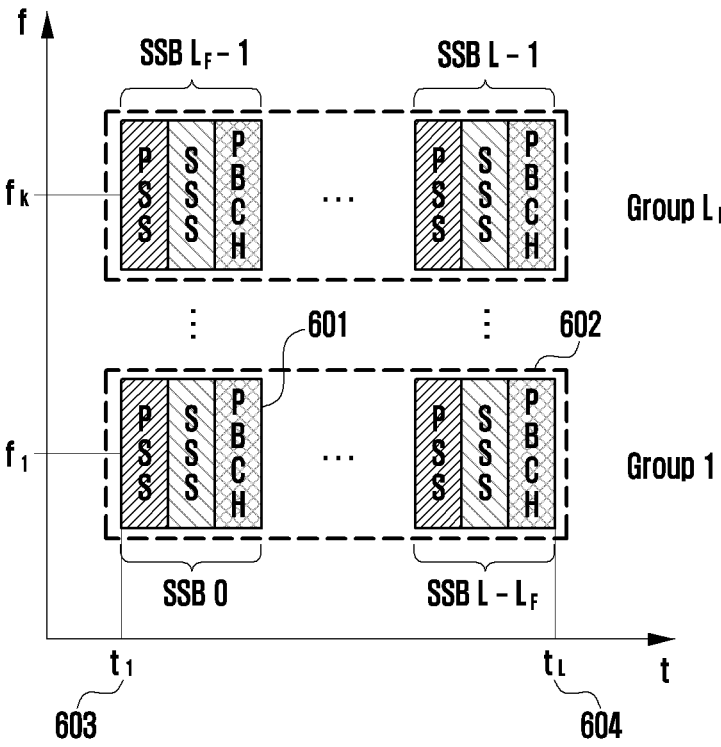
FIG. 6 illustrates an example of resource mapping of L frequency domain multiplexed (Frequency Domain Multiplexed) SSBs according to an embodiment of the disclosure.

FIG. 6 illustrates resource mapping of L FDM-multiplexed SSBs according to an embodiment of the disclosure. One SSB is composed of a primary synchronization sequence (PSS), a secondary synchronization sequence (SSS), and a physical broadcast channel (PBCH), and may be transmitted through three OFDM symbols (601). $L_F$ SSBs may be Frequency Domain Multiplexed and transmitted, and each of the SSBs may be mapped onto one of group 1 to group $L_F$, and may be mapped onto a resource to match the corresponding group corresponding to a center frequency (602). Further, all L SSBs may be continuously mapped from the OFDM symbol starting at time $t_1$ (603) to the OFDM symbol ending at time $t_L$ (604). Various embodiments of the disclosure include base station and UE methods in which L SSBs are Frequency Domain Multiplexed as many as $L_F$.

Figure 7:
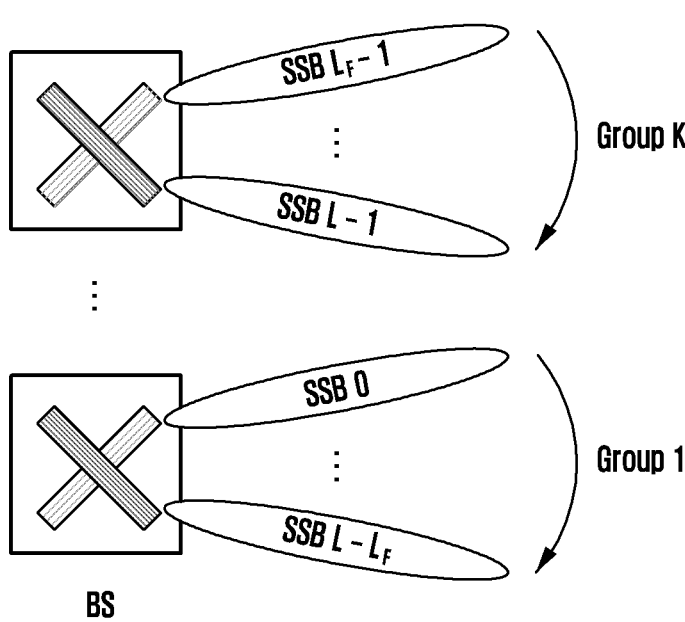
FIG. 7 illustrates an example of a panel operation method for a base station to transmit Frequency Domain Multiplexed SSBs according to an embodiment of the disclosure.

FIG. 7 illustrates an example of a panel operation method for a base station to transmit Frequency Domain Multiplexed SSBs according to an embodiment of the disclosure. L SSBs may be transmitted from a base station through one panel in different analog beam directions. Further, $L_F$ Frequency Domain Multiplexed SSBs may be simultaneously transmitted from the base station through panels corresponding to respective groups in the different analog beam directions. Accordingly, total L SSBs may be transmitted from the base station as the corresponding beams.

Figure 8:
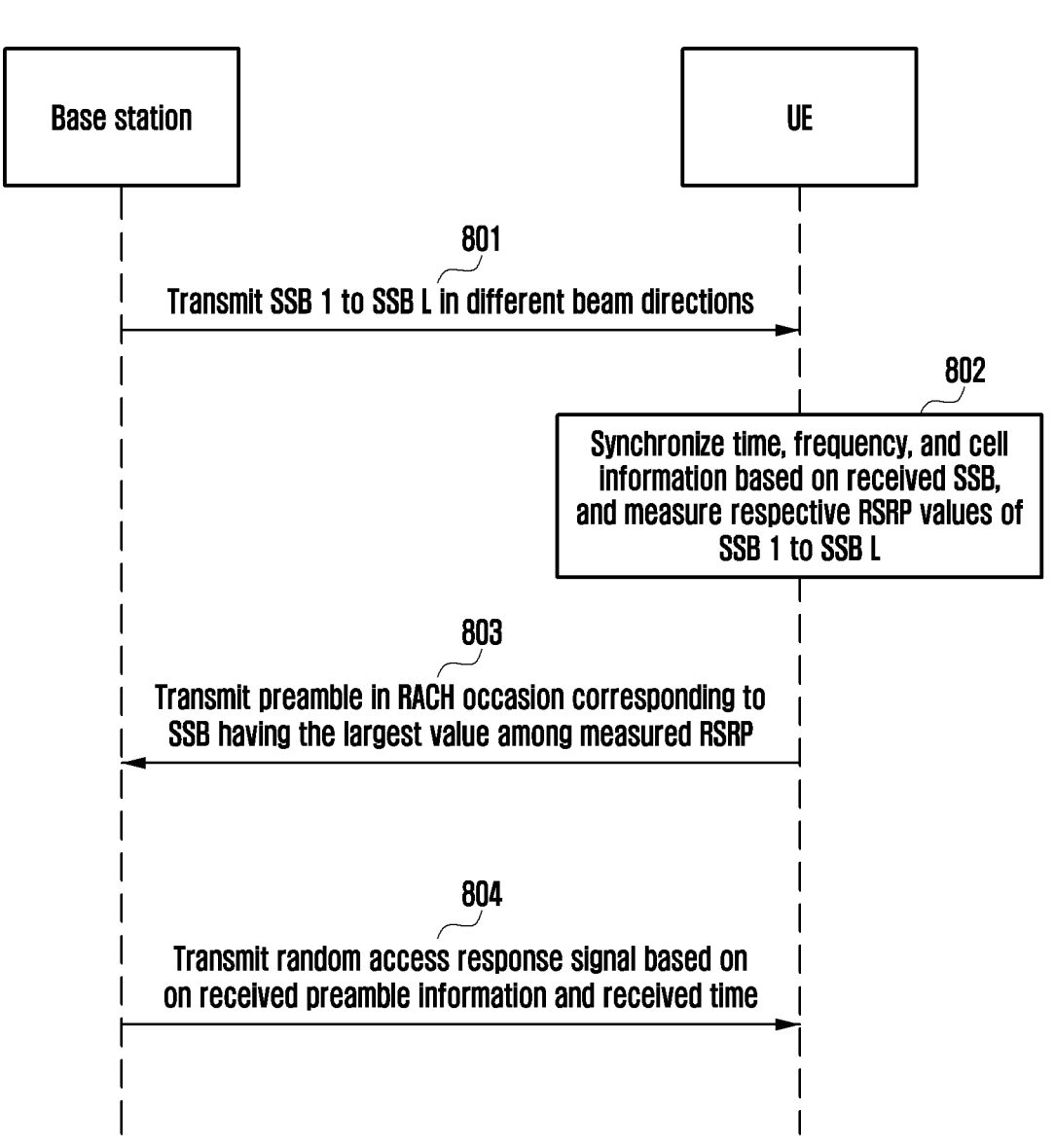
FIG. 8 illustrates a process in which a base station and a UE perform an initial access through SSBs according to an embodiment of the disclosure.

FIG. 8 illustrates a process in which a base station and a UE perform an initial access through SSBs according to an embodiment of the disclosure. As first described with reference to FIGS. 6 and 7, the base station may transmit L SSBs that are Frequency Domain Multiplexed as many as $L_F$ in different directions (801). The UE may synchronize time, frequency, and cell information based on the received SSBs, and measure RSRP values of SSB 1 to SSB L (802). Thereafter, the UE may transmit the preamble to inform of the index (or beam direction) of the SSB having the maximum value in a random access channel (RACH) occasion corresponding to the SSB having the maximum value among the measured RSRP values (803). After decoding the preamble signal transmitted by the UE, the base station may transmit additional information, such as time-axis synchronization and temporary identity, to the UE through a random access response signal (804).

Hereinafter, a method for transmitting and receiving $L_F$ Frequency Domain Multiplexed SSBs according to various embodiments of the disclosure will be described.

Figure 9A:
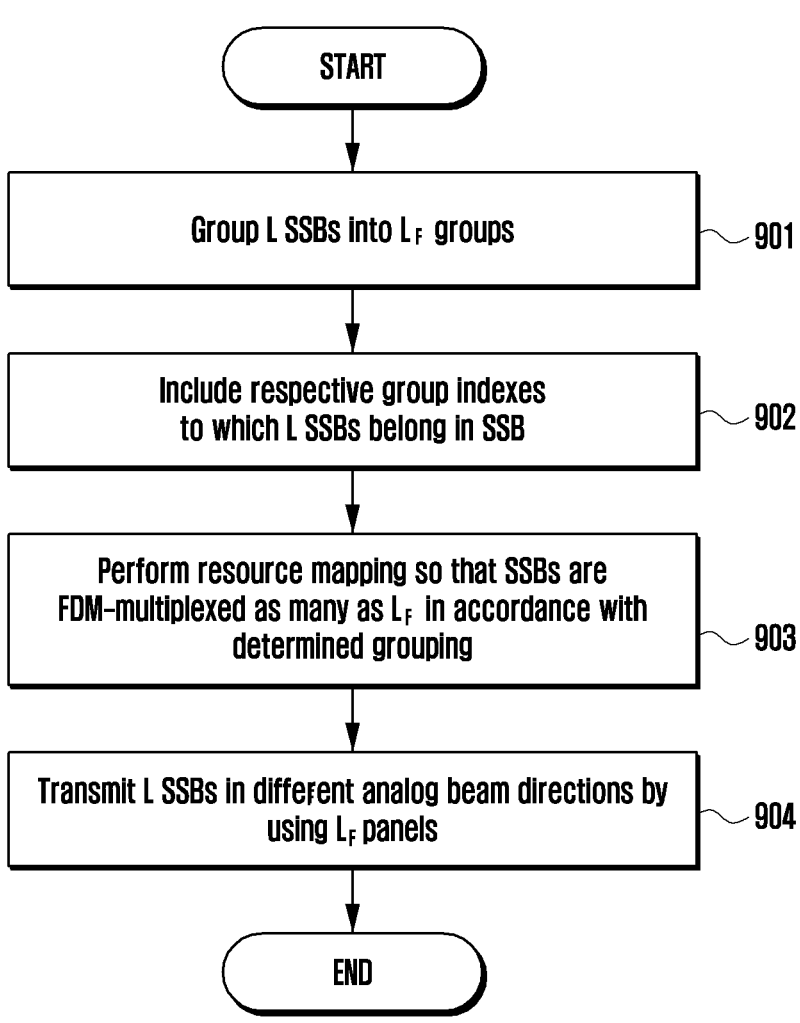
FIG. 9A is a diagram explaining an operation of a base station in case that the number $L_F$ of Frequency Domain Multiplexed SSBs is fixed according to an embodiment of the disclosure.
Figure 9B:
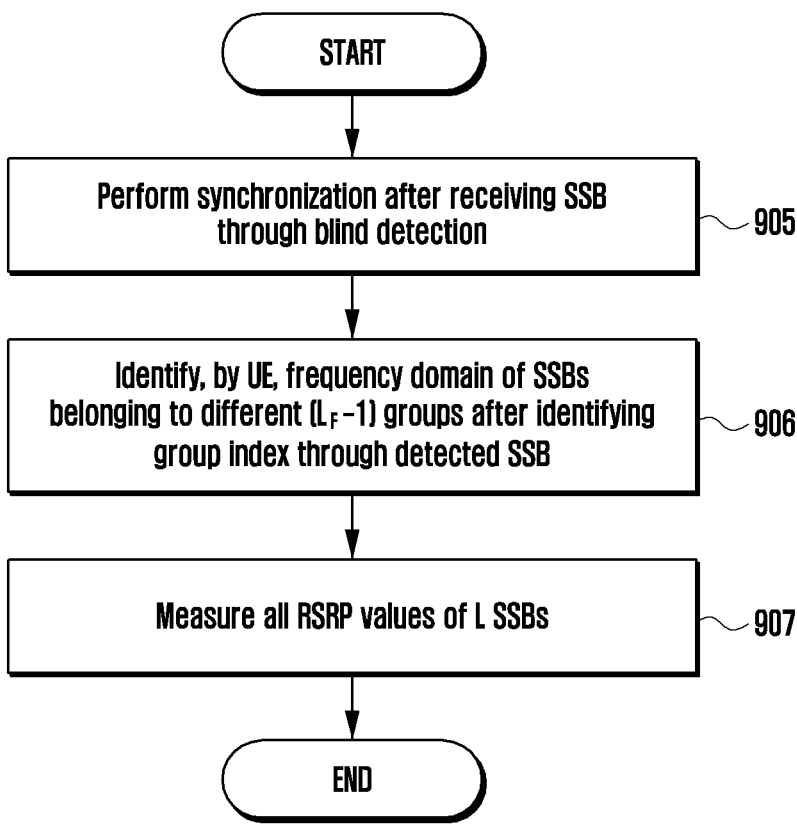
FIG. 9B is a diagram explaining an operation of a UE in case that the number $L_F$ of Frequency Domain Multiplexed SSBs is fixed according to an embodiment of the disclosure.

FIGS. 9A and 9B are diagrams explaining operations of a base station that transmits Frequency Domain Multiplexed SSBs and a UE that detects the SSBs in case that the number $L_F$ of the Frequency Domain Multiplexed SSBs is fixed (i.e., the values are preconfigured between the base station and the UE) according to an embodiment of the disclosure.

With reference to FIG. 9A, the base station may group L SSBs into $L_F$ groups (901). For example, the base station may identify the respective groups to which the L SSBs belong. The respective groups are related to different frequency domains for the FDM. Thereafter, the base station may include the group indexes in the L SSBs, respectively (902). The base station may perform the resource mapping so that the $L_F$ SSBs are Frequency Domain Multiplexed based on the corresponding frequency domains in accordance with the determined grouping (903). The base station may transmit the L SSBs in different analog beam directions by using $L_F$ panels (904).

With reference to FIG. 9B, the UE may receive one of the SSBs transmitted from the base station through blind detection. Further, the UE may perform synchronization based on the detected SSB (905). The UE may identify the group index of the detected SSB, and identify frequency domains of the SSBs belonging to $F_L-1$ different groups (906). For example, the frequency domain corresponding to the group index may be preconfigured between the base station and the UE. Further, the group index may indicate a relative location of the frequency domain, and thus the UE may identify the frequency domain to which the remaining groups belong based on the detected group index. The UE may receive the SSBs belonging to the $L_F-1$ groups based on the identified frequency domain. In such a manner, the UE may receive all the L SSBs belonging to the $L_F$ groups, and measure the RSRP value in order to select the optimum SSB (907).

Figure 10B:
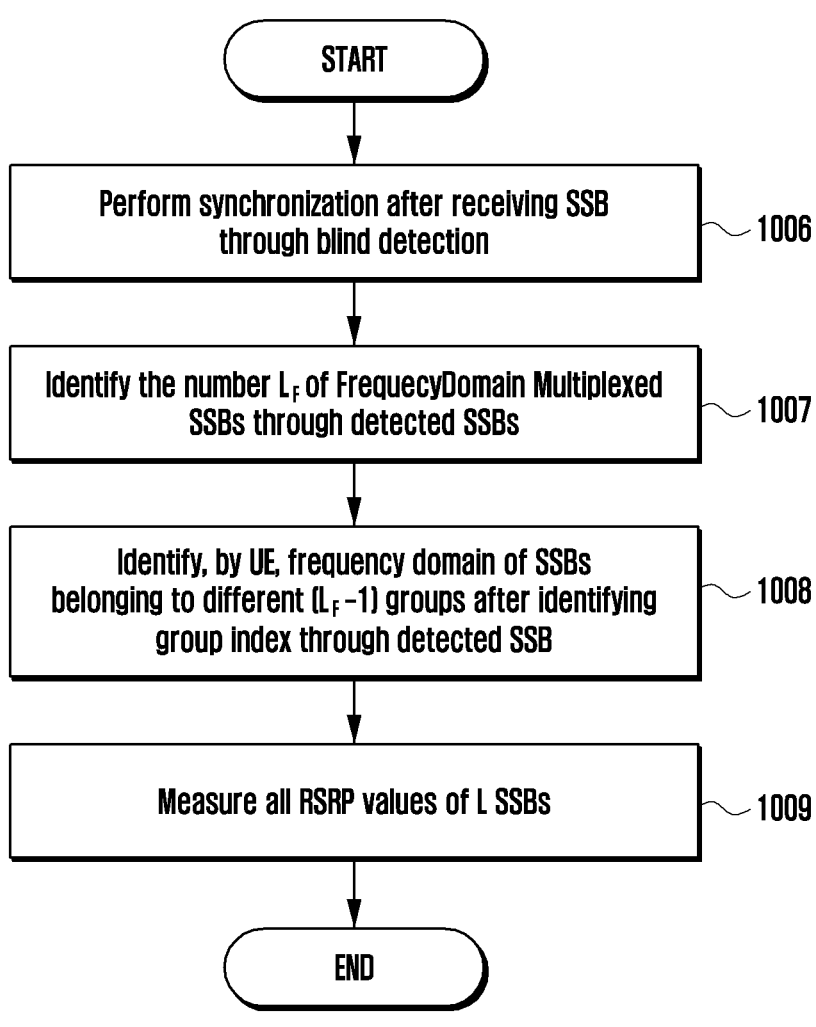
FIG. 10B is a diagram explaining an operation of a UE in case that the number $L_F$ of Frequency Domain Multiplexed SSBs can be variously configured according to an embodiment of the disclosure.

FIGS. 10A and 10B are diagrams explaining operations of a base station that transmits Frequency Domain Multiplexed SSBs and a UE that detects the SSBs in case that the number $L_F$ of the FDM-multiplexed SSBs can be variously configured by the base station according to an embodiment of the disclosure.

With reference to FIG. 10A, the base station may determine the number $L_F$ of SSBs to be Frequency Domain Multiplexed (1001). By the determined $L_F$ value, the base station may group the L SSBs into $L_F$ groups (1002). For example, the base station may identify the groups to which the L SSBs belong. The respective groups are related to different frequency domains for the FDM. Thereafter, the base station may include the group indexes and $L_F$ value information in the L SSBs, respectively (1003). The base station may perform the resource mapping so that the $L_F$ SSBs are Frequency Domain Multiplexed based on the corresponding frequency domains in accordance with the determined grouping (1004). The base station may transmit the L SSBs in different analog beam directions by using $L_F$ panels (1005).

With reference to FIG. 10B, the UE may receive one of the SSBs transmitted from the base station through blind detection. Further, the UE may perform synchronization based on the detected SSB (1006). The UE may identify the number $L_F$ of the Frequency Domain Multiplexed SSBs, for example, the number of SSB groups, through the detected SSBs (1007). Further, the UE may identify the group index included in the detected SSB, and identify the frequency domains of the SSBs belonging to the $L_F-1$ different groups (1008). For example, the frequency domain corresponding to the group index may be preconfigured between the base station and the UE. Further, the group index may indicate the relative location of the frequency domain, and thus the UE may identify the frequency domain to which the remaining groups belong based on the detected group index. The UE may receive the SSBs belonging to the $L_F-1$ groups based on the identified frequency domain. In such a manner, the UE may receive all the L SSBs belonging to the $L_F$ groups, and measure the RSRP value in order to select the optimum SSB (1009).

Figure 11:
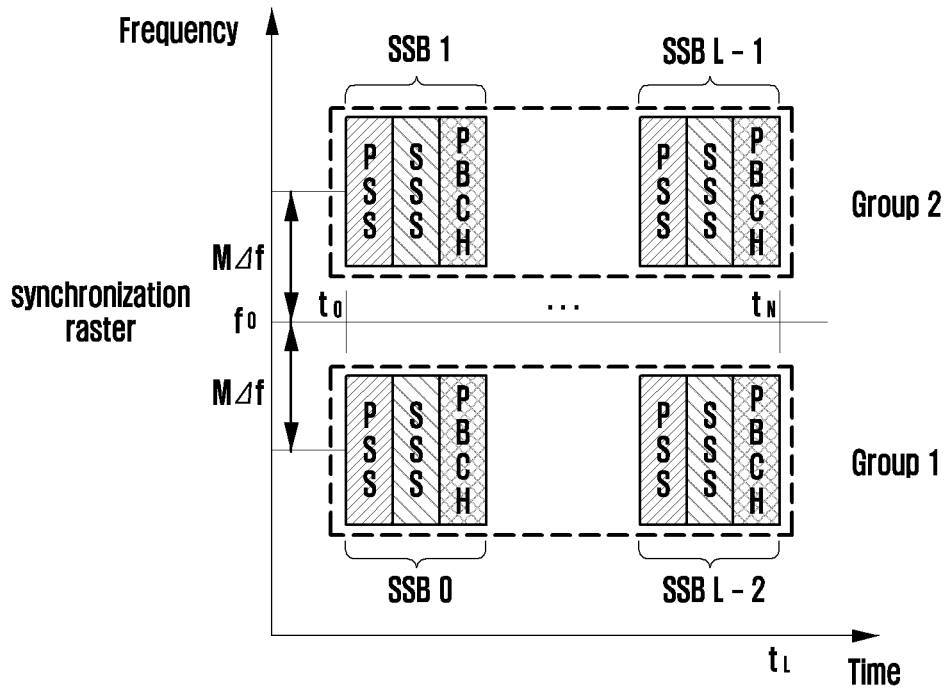
FIG. 11 is a diagram illustrating an example in which a base station groups and transmits SSBs through a panel in a situation that the number of Frequency Domain Multiplexed SSBs is $L_F$=2 according to an embodiment of the disclosure.
Figure 11:
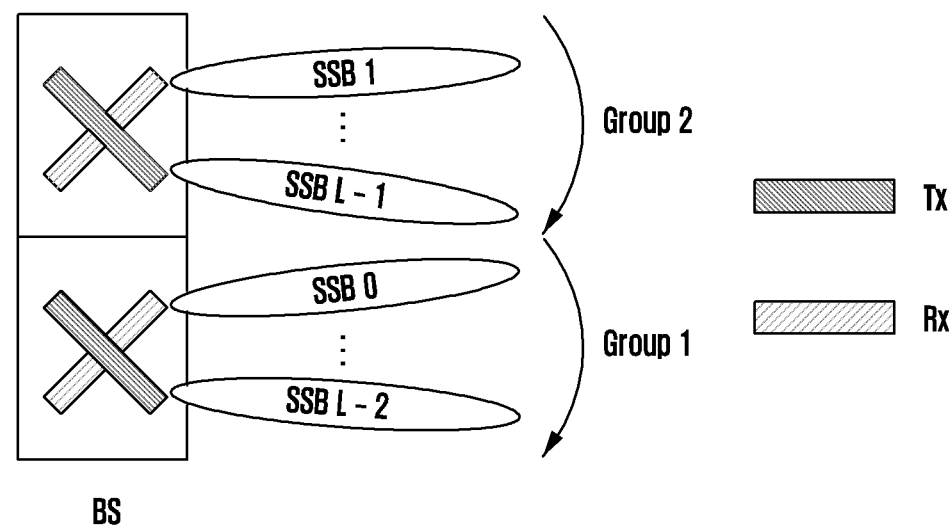

FIG. 11 is a diagram illustrating an example in which a base station groups and transmits SSBs through a panel as illustrated in FIGS. 6 and 7 in a situation that the number of Frequency Domain Multiplexed SSBs is $L_F=2$ according to an embodiment of the disclosure.

Similarly to NR, PSS and SSS may be generated through M-sequence, and may transfer different pieces of information through different cyclic shifts (refer to TS 38.211 7.4.2). PBCH may be transmitted by using QPSK modulation similar to the NR (TS 38.211 7.3.3). As being specified in FIG. 11, the base station may group, for example, even-numbered SSBs into group 1 and odd-numbered SSBs into group2, respectively. For example, starting with $f_o$ that is a kind of synchronization raster, the base station may map the SSBs belonging to the group 1 onto $f_0-M\Delta f$ (M: the arbitrary number of subcarriers, and $\Delta f$: subcarrier spacing) frequency domain, and the SBSs belonging to the group 2 onto $f_0+M\Delta f$ frequency domain, respectively. Further, from the viewpoint of the panel operation, all SSBs SSB i (i=0, . . . , L−1) are transmitted through analog beams at an angle of $$360°\frac{i}{L} \text{ to } 360°\frac{i+1}{L},$$

and the SSBs corresponding to the group 1 may be transmitted through lower panels, and the SSBs corresponding to the group 2 may be transmitted through upper panels.

Figure 12A:
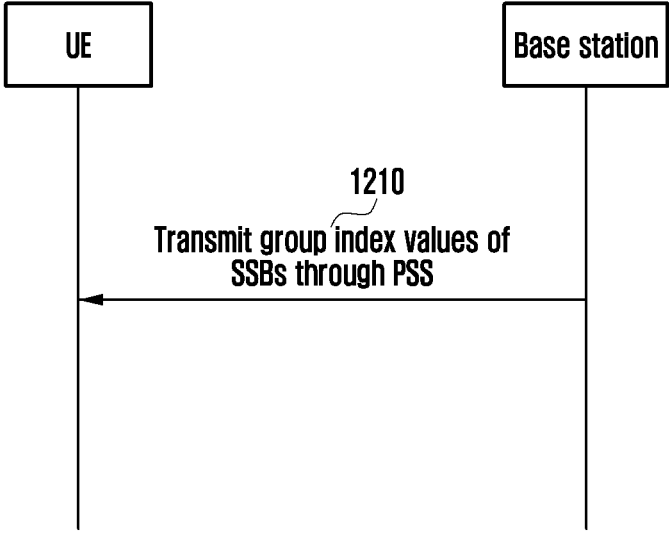
FIG. 12A is a diagram explaining an example in which a base station transmits group indexes of SSBs to a UE through a primary synchronization sequence (PSS) in case that the number $L_F$ of Frequency Domain Multiplexed SSBs is fixed according to an embodiment of the disclosure.
Figure 12B:
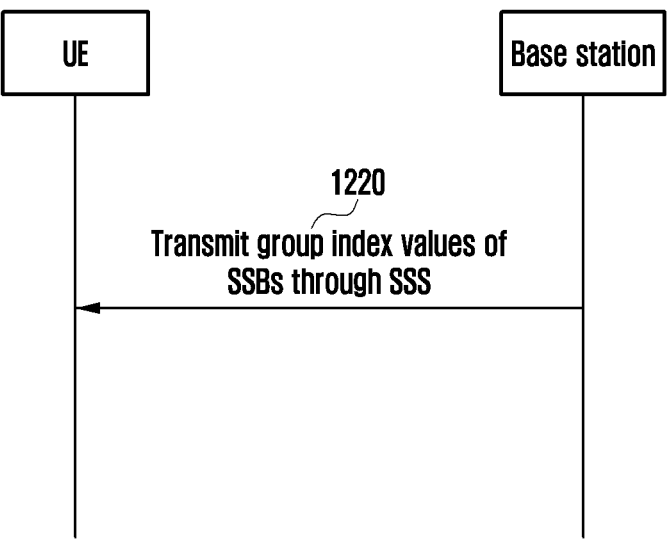
FIG. 12B is a diagram explaining an example in which a base station transmits group indexes of SSBs to a UE through a secondary synchronization sequence (SSS) in case that the number $L_F$ of Frequency Domain Multiplexed SSBs is fixed according to an embodiment of the disclosure.
Figure 12C:
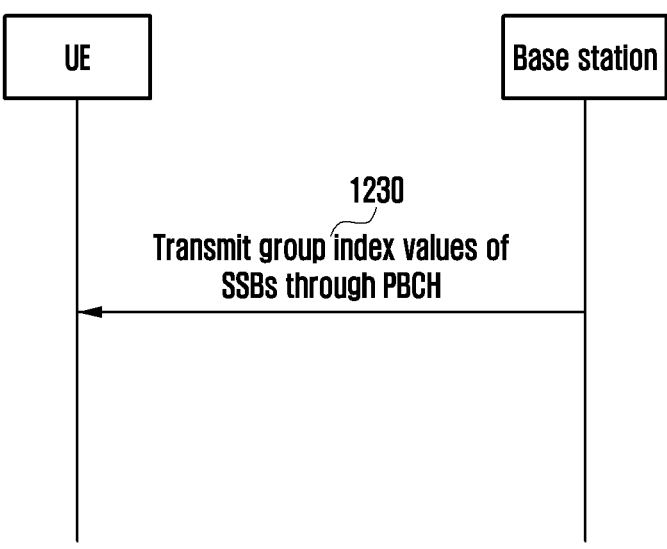
FIG. 12C is a diagram explaining an example in which a base station transmits group indexes of SSBs to a UE through a physical broadcast channel (PBCH) in case that the number $L_F$ of Frequency Domain Multiplexed SSBs is fixed according to an embodiment of the disclosure.

FIGS. 12A to 12C illustrate various examples in which a base station transmits group indexes of SSBs in case that the number $L_F$ of Frequency Domain Multiplexed SSBs is fixed according to an embodiment of the disclosure.

With reference to FIG. 12A, in case that the number $L_F$ of FDM-multiplexed SSBs is fixed, the base station transmits group indexes of the respective SSBs to the UE through PSS in the SSB (1210). For example, in case of $L_F=2$, the group indexes i=1, 2 may be transmitted to the PSS through Mathematical expression $\{d_{pss,i}(n)\}|_{n=0, \ldots ,127}$ like Mathematical expression 1.

$d_{pss,i}(n)=1-2x(m),m=(n+43\cdot i)\text{mod } 127, n=0,1, \ldots 127,$ where $x(m+7)=(x(m+4)+x(m))\text{mod } 2$ with $[x(6)x(5)x(4)x(3)x(2)x$
$(1)x(0)]=[1\ 1\ 1\ 0\ 1\ 1\ 0].$     Mathematical expression 1

The UE may be aware of the group indexes after taking correlation of $\{d_{pss,1}(n)\}|_{n=0, \ldots ,127}$ and $\{d_{pss,2}(n)\}|_{n=0, \ldots ,127}$ with the received PSS signals $\{Y(n)\}|_{n=0, \ldots ,127}$.

With reference to FIG. 12B, in case that the number $L_F$ of Frequency Domain Multiplexed SSBs is fixed, the base station transmits group indexes of the respective SSBs to the UE through SSS in the SSB (1220). For example, in case of $L_F=2$, the group indexes i=1, 2 may be transmitted to the SSS through Mathematical expression $\{d_{pss,i}(n)\}|_{n=0, \ldots ,127}$ like Mathematical expression 2.

$d_{sss,i}(n)=[1-2x_0((n+5i)\text{mod } 127)][1-2x_1(n \text{ mod } 127)],$
$n=0,1, \ldots 127,$ where $x_0(m+7)=(x_0(m+4)+x_0(m))\text{mod } 2, x_1(m+7)=(x_1(m+1)+x_1(m))\text{mod } 2$ with $[x_1(6)x_1(5)x_1(4)x_1(3)x_1$
$(2)x_1(1)x_1(0)]=[0\ 0\ 0\ 0\ 0\ 0\ 1].$     Mathematical expression 2

The UE may be aware of the group indexes after taking correlation of $\{d_{pss,1}(n)\}|_{n=0, \ldots ,127}$ and $\{d_{pss,2}(n)\}|_{n=0, \ldots ,127}$ with the received signals $\{y(n)\}|_{n=0, \ldots ,127}$.

With reference to FIG. 12C, in case that the number $L_F$ of Frequency Domain Multiplexed SSBs is fixed, the base station transmits group indexes of the respective SSBs to the UE through PBCH in the SSB (1230). For example, in case of $L_F=2$, the group indexes i=1, 2 may be transmitted to the PBCH through Mathematical expression $d_{PBCH,i}(0)$ like Mathematical expression 3.

BPSK modulation: $d_{PBCH,i}(0)=1-2(i-1)$   Mathematical expression 3

The UE may be aware of the group indexes based on coherent detection with respect to $d_{PBCH,i}(0)$ after proceeding with channel estimation with respect to DMRS included in the PBCH.

The embodiment below relates to a process of determining the number $L_F$ of Frequency Domain Multiplexed SSBs, for example, the number of SSB groups. Typically, in case that the number $L_F$ is configured to be large, and the number of Frequency Domain Multiplexed SSBs is increased, the number of times for the UE to perform blind detection of the SSBs is increased, and damage occurs to the UE in terms of complexity. In addition, as the number of Frequency Domain Multiplexed SSBs is increased, the peak-to-average power ratio (PAPR) of the signal being transmitted by the base station becomes larger, and if the power amplifier (PA) backoff value is increased, the output transmission power of the base station becomes lowered to reduce the communication coverage. However, as the number $L_F$ of Frequency Domain Multiplexed SSBs is increased, the beam sweeping time resource overhead is reduced, and this is useful when frequent beam tracking is necessary in a situation where the UE moves. Accordingly, the base station may determine the optimized $L_F$ value to meet the situation in consideration of the trade-off between a proper coverage and beam sweeping resource overhead in a given communication environment.

Figure 13A:
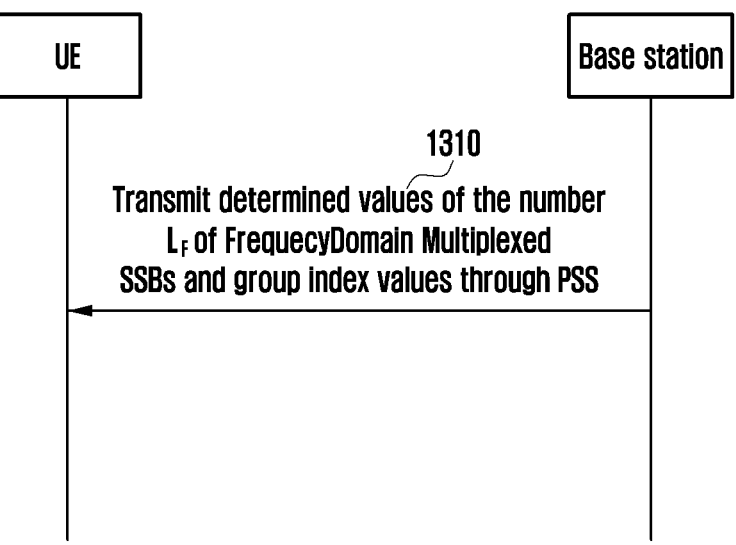
FIG. 13A is a diagram explaining an example in which a base station transmits $L_F$ values to a UE through a PSS in case that the number $L_F$ of Frequency Domain Multiplexed SSBs can be variously configured according to an embodiment of the disclosure.
Figure 13B:
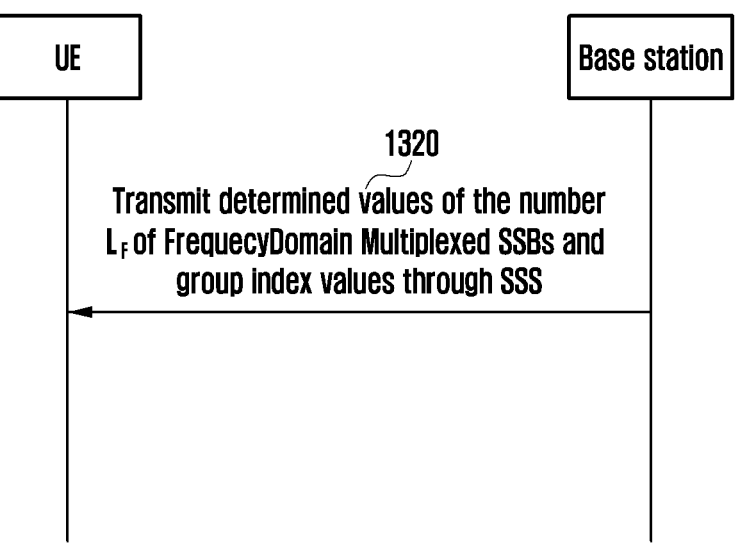
FIG. 13B is a diagram explaining an example in which a base station transmits $L_F$ values to a UE through an SSS in case that the number $L_F$ of Frequency Domain Multiplexed SSBs can be variously configured according to an embodiment of the disclosure.
Figure 13C:
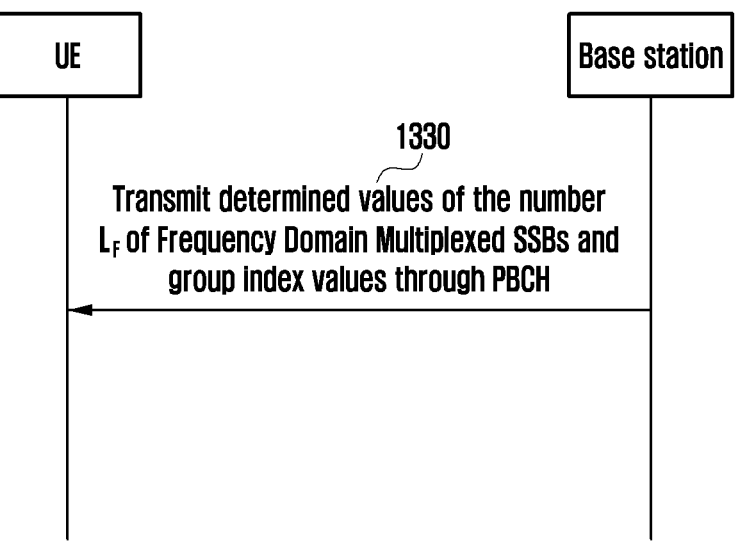
FIG. 13C is a diagram explaining an example in which a base station transmits $L_F$ values to a UE through a PBCH in case that the number $L_F$ of Frequency Domain Multiplexed SSBs can be variously configured according to an embodiment of the disclosure.

FIGS. 13A to 13C illustrate various examples in which a base station transmits the number $L_F$ of Frequency Domain Multiplexed SSBs and group indexes of the respective SSBs in case that the number $L_F$ of Frequency Domain Multiplexed SSBs can be variously configured according to an embodiment of the disclosure.

With reference to FIG. 13A, in case that the number $L_F$ of Frequency Domain Multiplexed SSBs can be variously configured, the base station transmits the $L_F$ values and group index values to the UE through PSS in the SSB (1310). In this case, the group index values are as described above in FIG. 12A.

For example, in case that the possible $L_F$ values are $L_F \in \{1,2,4\}$, the $L_F$ values may be transmitted to the PSS through Mathematical expression $\{d_{pss,i}(n)\}|_{n=0, \ldots ,127}$ like Mathematical expression 4.

$d_{pss,i}(n)=1-2x(m), m=(n+43\cdot l)\text{mod } 127, n=01, \ldots 127,$ where $l=0$ for $L_F=1$, $l=1$ for $L_F=2$, and $l=2$ for $L_F=4$ $$x(m+7)=(x(m+4)+x(m)) \bmod 2 \text{ with}$$

$$[x(6)x(5)x(4)x(3)x(2)x(1)x(0)]=[11 \ 10 \ 11 \ 0] \quad \text{Mathematical expression 4}$$

The UE may be aware of the $L_F$ values after taking correlation of $\{d_{pss,1}(n)\}|_{n=0,\ldots,127}$, $\{d_{pss,2}(n)\}|_{n=0,\ldots,127}$, and $\{d_{pss,3}(n)\}|_{n=0,\ldots,127}$ with the received signals $\{y(n)\}|_{n=0,\ldots,127}$.

With reference to FIG. 13B, in case that the number $L_F$ of Frequency Domain Multiplexed SSBs can be variously configured, the base station transmits the $L_F$ values and group index values to the UE through SSS in the SSB (1320). In this case, the group index values are as described above in FIG. 12B.

For example, in case that the possible $L_F$ values are $L_F \in \{1,2,4\}$, the $L_F$ values may be transmitted to the SSS through Mathematical expression $\{d_{pss,1}(n)\}|_{n=0,\ldots,127}$ like Mathematical expression 5.

$$d_{sss,i}(n)=[1-2x_0((n+5l) \bmod 127)][1-2x_1(n \bmod 127)],$$

where $l=0$ for $L_F=1$, $l=1$ for $L_F=2$, and $l=2$ for $L_F=4$, $n=0,1,\ldots 127$, $$x_0(m+7)=(x_0(m+4)+x_0(m)) \bmod 2, x_1(m+7)=(x_1(m+1)+x_1(m)) \bmod 2$$

with $$[x_0(6)x_0(5)x_0(4)x_0(3)x_0(2)x_0(1)x_0(0)]=[00 \ 00 \ 00 \ 1]$$

$$[x_1(6)x_1(5)x_1(4)x_1(3)x_1(2)x_1(1)x_1(0)]=[00 \ 00 \ 00 \ 1]. \quad \text{Mathematical expression 5}$$

The UE may be aware of the $L_F$ values after taking correlation of $\{d_{sss,1}(n)\}|_{n=0,\ldots,127}$, $\{d_{sss,2}(n)\}|_{n=0,\ldots,127}$, and $\{d_{dss,3}(n)\}|_{n=0,\ldots,127}$ with the received signals $\{y(n)\}|_{n=0,\ldots,127}$.

With reference to FIG. 13C, in case that the number $L_F$ of Frequency Domain Multiplexed SSBs can be variously configured, the base station transmits the $L_F$ values and group index values to the UE through PBCH in the SSB (1330). In this case, the group index values are as described above in FIG. 12C.

For example, in case that the possible $L_F$ values are $L_F \in \{1,2,4\}$, the $L_F$ values may be transmitted to the PBCH through Mathematical expression $d_{PBCH}(O)$ like Mathematical expression 6.

$$\text{QPSK modulation: } d_{PBCH,i}(0)=1+j \text{ for } L_F=0, -1+j \text{ for } L_F=2, 1-j \text{ for } L_F=4. \quad \text{Mathematical expression 6}$$

The UE may be aware of the $L_F$ values based on coherent detection with respect to $d_{PBCH}(O)$ after proceeding with the channel estimation with respect to DMRS included in the PBCH.

Figure 14:
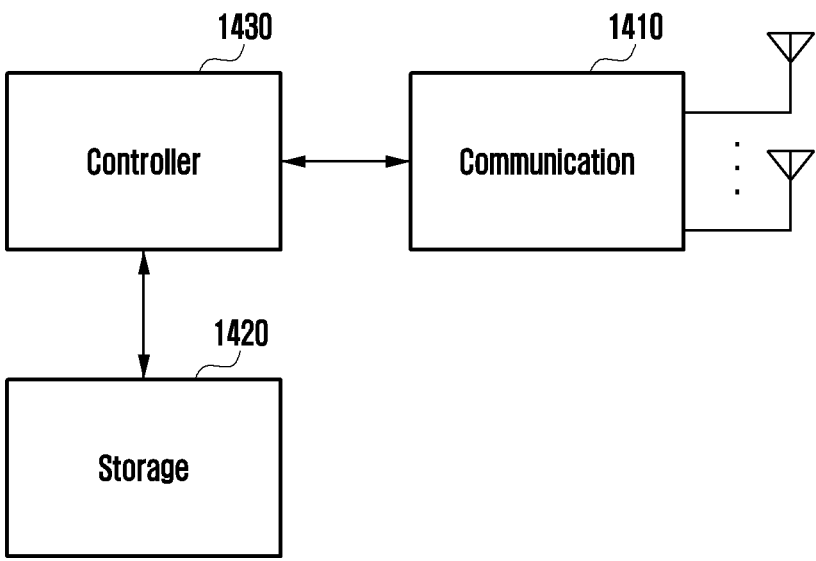
FIG. 14 is a block diagram schematically illustrating the structure of a UE according to an embodiment of the disclosure.

FIG. 14 is a diagram illustrating the schematic constitution of a UE in a wireless communication system according to an embodiment of the disclosure.

The constitution illustrated in FIG. 14 may be understood as the constitution of a UE. The term "~unit" or "~er (or)", as used herein, may mean a unit of processing at least one function or operation, and may be implemented by hardware, software, or a combination of the hardware and software.

With reference to FIG. 14, the UE includes a communication unit 1410, a storage unit 1420, and a controller 1430. However, the constituent elements of the UE 1400 are not limited to the above-described examples. For example, the UE 1400 may include more or less constituent elements than the above-described constituent elements. In addition, the communication unit 1410, the storage unit 1420, and the controller 1430 may be implemented in the form of one chip. Further, the controller 1430 may include one or more processors.

The communication unit 1410 performs functions for transmitting and receiving signals through a radio channel. For example, the communication unit 1410 performs a conversion function between a baseband signal and a bit string in accordance with the physical layer standards of the system. For example, during data transmission, the communication unit 1410 generates complex symbols by encoding and modulating a transmission bit string. Further, during data reception, the communication unit 1410 restores a reception bit string through demodulation and decoding of the baseband signal. Further, the communication unit 1410 performs up-conversion of the baseband signal into an RF band signal to transmit the converted RF band signal through an antenna, and performs down-conversion of the RF band signal received through the antenna into the baseband signal. For example, the communication unit 1410 may include a transmission filter, a reception filter, an amplifier, a mixer, an oscillator, a DAC, and an ADC.

Further, the communication unit 1410 may include a plurality of transmission/reception paths. Further, the communication unit 1410 may include at least one antenna array composed of a plurality of antenna elements. From the viewpoint of hardware, the communication unit 1410 may be composed of a digital circuit and an analog circuit (e.g., radio frequency integrated circuit (RFIC)). Here, the digital circuit and the analog circuit may be implemented as one package. Further, the communication unit 1410 may include a plurality of RF chains. Further, the communication unit 1410 may perform beamforming.

The communication unit 1410 transmits and receives the signals as described above. Accordingly, the whole or a part of the communication unit 1410 may be called a transmitter, a receiver, or a transceiver. Further, in the following description, the transmission and reception being performed through a radio channel may be used in the sense of including performing of the above-described processes through the communication unit 1410.

The storage unit 1420 stores therein a basic program for an operation of the UE 1400, application programs, and data of configuration information. The storage unit 1420 may be composed of a volatile memory, a nonvolatile memory, or a combination of the volatile memory and the nonvolatile memory. Further, the storage unit 1420 provides the stored data in accordance with a request from the controller 1430.

The controller 1430 control the overall operation of the UE. For example, the controller 1430 transmits and receives the signals through the communication unit 1410. Further, the controller 1430 records or reads data in or from the storage unit 1420. Further, the controller 1430 may perform functions of a protocol stack being required in the communication standards. For this, the controller 1430 may include at least one processor or microprocessor, or may be a part of the processor. Further, a part of the communication unit 1410 and the controller 1430 may be called a communication processor (CP). According to an embodiment, the controller 1430 may control the operation that is performed by the UE according to various embodiments of the disclosure as described above.

For example, the controller 1430 may control to receive the synchronization signal block (SSB) from the base station based on the blind detection, and identify the information about the SSB group to which the SSB belongs based on the received SSB. In this case, the SSB group is related to the first frequency domain.

The controller 1430 may identify the second frequency domain corresponding to at least one other SSB group based on the information about the SSB group, and control to receive the at least one SSB belonging to the at least one other SSB group from the base station based on the second frequency domain.

The information about the SSB group may be included in any one of a primary synchronization sequence (PSS), a secondary synchronization sequence (SSS), or a physical broadcast channel (PBCH) in the received SSB, and may be transmitted.

The information about the SSB group may include, for example, a SSB group index to which the SSB belongs in case that the number of SSB groups (the number of FDM-multiplexed SSBs) is a prefixed value.

The information about the SSB group may include, for example, information on the total number of SSB groups and the SSB group index to which the SSB belongs in case that the number of SSB groups (the number of Frequency Domain Multiplexed SSBs) can be variously configured by the base station.

The controller 1430 may control to transmit a random access channel (RACH) preamble to the base station on a RACH occasion corresponding to the SSB selected based on the SSB group and a reference signal received power (RSRP) of the SSBs belonging to the at least one other SSB group.

Figure 15:
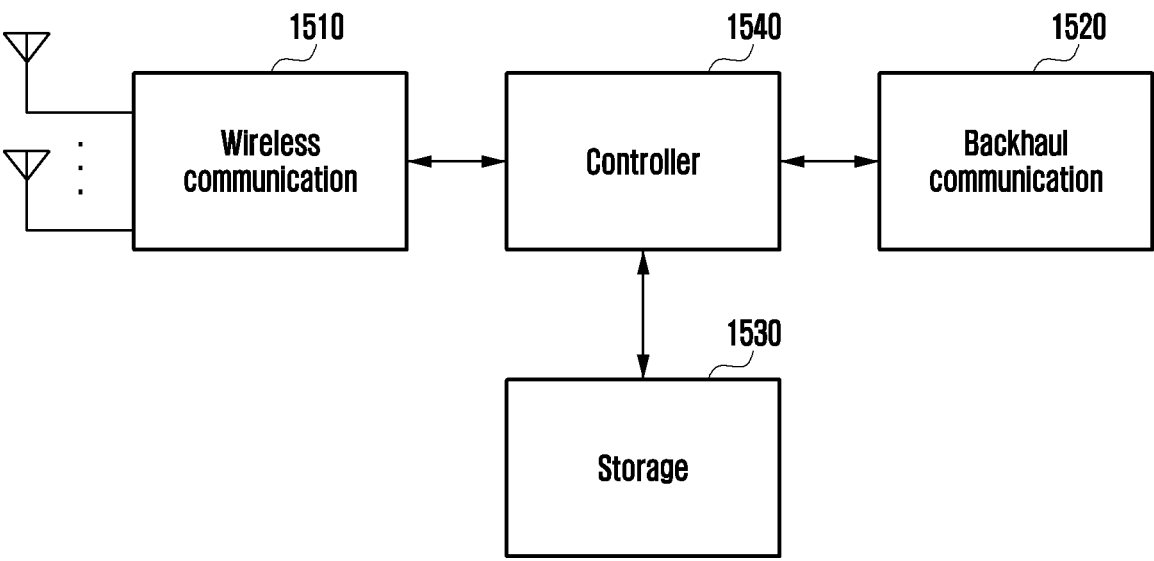
FIG. 15 is a block diagram schematically illustrating the structure of a base station according to an embodiment of the disclosure.

FIG. 15 illustrates the constitution of a base station in a wireless communication system according to an embodiment of the disclosure. The constitution illustrated in FIG. 15 may be understood as the constitution of the base station. The term "~unit" or "~er (or)", as used herein, may mean a unit of processing at least one function or operation, and may be implemented by hardware, software, or a combination of the hardware and software.

With reference to FIG. 15, the base station includes a wireless communication unit 1510, a backhaul communication unit 1520, a storage unit 1530, and a controller 1540. However, the constituent elements of the base station are not limited to the above-described examples. For example, the base station may include more or less constituent elements than the above-described constituent elements. In addition, the wireless communication unit 1510, the backhaul communication unit 1520, the storage unit 1530, and the controller 1540 may be implemented in the form of one chip. Further, the controller 1540 may include one or more processors.

The wireless communication unit 1510 performs functions for transmitting and receiving signals through a radio channel. For example, the wireless communication unit 1510 performs a conversion function between a baseband signal and a bit string in accordance with the physical layer standards of the system. For example, during data transmission, the wireless communication unit 1510 generates complex symbols by encoding and modulating a transmission bit string. Further, during data reception, the wireless communication unit 1510 restores a reception bit string through demodulation and decoding of the baseband signal.

Further, the wireless communication unit 1510 performs up-conversion of the baseband signal into a radio frequency (RF) band signal to transmit the converted RF band signal through an antenna, and performs down-conversion of the RF band signal received through the antenna into the baseband signal. For this, the wireless communication unit 1510 may include a transmission filter, a reception filter, an amplifier, a mixer, an oscillator, a digital-to-analog converter (DAC), and an analog-to-digital converter (ADC). Further, the wireless communication unit 1510 may include a plurality of transmission/reception paths. Further, the wireless communication unit 1510 may include at least one antenna array composed of a plurality of antenna elements.

From the viewpoint of hardware, the wireless communication unit 1510 may be composed of a digital unit and an analog unit, and the analog unit may be composed of a plurality of sub-units in accordance with an operation power, an operating frequency, and the like. The digital unit may be implemented by at least one processor (e.g., digital signal processor (DSP)).

The wireless communication unit 1510 transmits and receives the signals as described above. Accordingly, the whole or a part of the wireless communication unit 1510 may be called a transmitter, a receiver, or a transceiver. Further, in the following description, the transmission and reception being performed through a radio channel may be used in the sense of including performing of the above-described processes through the wireless communication unit 1510.

The backhaul communication unit 1520 provides an interface for performing communication with other nodes in the network. That is, the backhaul communication unit 1520 converts the bit string that is transmitted from the base station to other nodes, for example, other connection nodes, other base stations, upper nodes, and core networks, into a physical signal, and converts the physical signal being received from other nodes into the bit string.

The storage unit 1530 stores therein a basic program for an operation of the base station, application programs, and data of configuration information. The storage unit 1530 may be composed of a volatile memory, a nonvolatile memory, or a combination of the volatile memory and the nonvolatile memory. Further, the storage unit 1530 provides the stored data in accordance with a request from the controller 1540.

The controller 1540 control the overall operation of the base station. For example, the controller 1540 transmits and receives the signals through the wireless communication unit 1510 or the backhaul communication unit 1520. Further, the controller 1540 records or reads data in or from the storage unit 1530. Further, the controller 1540 may perform functions of a protocol stack being required in the communication standards. According to another implementation example, the protocol stack may be included in the wireless communication unit 1510. For this, the controller 1540 may include at least one processor. According to an embodiment, the controller 1540 may control the operation that is performed by the base station according to various embodiments of the disclosure as described above.

For example, the controller 1540 may identify synchronization signal block (SSB) groups to which the plurality of SSBs belong. In this case, the SSB groups are related to different frequency domains.

The controller 1540 may perform the resource mapping for the plurality of SSBs including information about the SSBN group to which the controller itself belongs based on the frequency domain corresponding to the SSB group to which the controller itself belongs, and may control to transmit the plurality of SSBs including the information about the SSB groups to which the controller itself belongs on the mapped resource.

The information about the SSB group may be included in any one of a primary synchronization sequence (PSS), a secondary synchronization sequence (SSS), or a physical broadcast channel (PBCH) in the received SSB, and may be transmitted.

The information about the SSB group may include, for example, a SSB group index to which the SSB belongs in case that the number of SSB groups (the number of FDM-multiplexed SSBs) is a prefixed value.

The information about the SSB group may include, for example, information on the total number of SSB groups and the SSB group index to which the SSB belongs in case that the number of SSB groups (the number of Frequency Domain Multiplexed SSBs) can be variously configured by the base station.

The controller 1540 may control to receive the RACH preamble from the UE on the random access channel (RACH) occasion corresponding to the SSB selected based on the reference signal received power (RSRP) of the plurality of SSBs.

In the various embodiments as described above, various constituent elements of the disclosure have been expressed in a singular or plural form according to the proposed detailed embodiments. However, the singular or plural expression has been selected suitably for a situation proposed for convenience of explanation, and the disclosure is not limited to the singular or plural constituent elements. Although an element has been expressed in the plural form, it may be configured in the singular form, and although an element has been expressed in the singular form, it may be configured in the plural form.

Meanwhile, operations proposed in various embodiments of the disclosure can be performed to be combined into one sequence within a range in which the operations do not interfere with each other. That is, the UE and the base station may perform at least two operations proposed in various embodiments proposed above within the range in which the two operations do not interfere with each other so that the UE can receive the SSBs and transmit the RACH preamble based on the selected SSB.

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the appended claims but also equivalents thereof.

The invention claimed is:

1. A method performed by a user equipment (UE) in a wireless communication system, the method comprising:
   receiving, from a base station, a synchronization signal block (SSB) included in frequency division multiplexed SSBs based on blind detection;
   identifying that the SSB belongs to a first SSB group corresponding to a first frequency domain, based on information on an SSB group, wherein the information on the SSB group is included in the SSB and indicates a location of a frequency domain associated with the frequency division multiplexed SSBs;
   determining a second frequency domain corresponding to a second SSB group based on the information on the SSB group; and
   receiving, from the base station, an SSB belonging to the second SSB group based on the second frequency domain.

2. The method of claim 1, wherein the information on the SSB group is included in at least one of a primary synchronization sequence (PSS), a secondary synchronization sequence (SSS), or a physical broadcast channel (PBCH) of the SSB belonging to the first SSB group.

3. The method of claim 1, wherein the information on the SSB group includes an SSB group index to which an SSB belongs.

4. The method of claim 1, wherein the information on the SSB group includes information on a total number of SSB groups and an SSB group index to which an SSB belongs.

5. The method of claim 1, further comprising:
   transmitting, to the base station, a random access channel (RACH) preamble on an RACH occasion corresponding to an SSB selected based on a reference signal received power (RSRP) of SSBs belonging to the first SSB group and the second SSB group.

6. A method performed by a base station in a wireless communication system, the method comprising:
   determining a synchronization signal block (SSB) group to which each of SSBs belongs, wherein each SSB group is related to a different frequency domain;
   generating frequency division multiplexed SSBs based on a resource mapping of the SSBs; and
   transmitting, to a user equipment (UE), the frequency division multiplexed SSBs, wherein information on the SSB group is included in an SSB of the frequency division multiplexed SSBs and indicates a location of a frequency domain associated with the frequency division multiplexed SSBs,
   wherein a first frequency domain corresponding to a first SSB group including the SSB and a second frequency domain corresponding to a second SSB group including another SSB is determined by the UE based on the reception of the SSB.

7. The method of claim 6, wherein the information on the SSB group is included in at least one of a primary synchronization sequence (PSS), a secondary synchronization sequence (SSS), or a physical broadcast channel (PBCH) of the SSB belonging to the first SSB group.

8. The method of claim 6, wherein the information on the SSB group includes information on a total number of SSB groups and an SSB group index to which an SSB belongs.

9. The method of claim 6, further comprising:
   receiving, from the UE, a random access channel (RACH) preamble on an RACH occasion corresponding to an SSB selected based on a reference signal received power (RSRP) of SSBs belonging to the first SSB group and the second SSB group.

10. A user equipment (UE) in a wireless communication system, the UE comprising:
   a transceiver; and
   a controller coupled to the transceiver and configured to:
      receive, from a base station, a synchronization signal block (SSB) included in frequency division multiplexed SSBs based on blind detection,
      identify that the SSB belongs to a first SSB group corresponding to a first frequency domain, based on information on an SSB group, wherein the information on the SSB group is included in the SSB and indicates a location of a frequency domain associated with the frequency division multiplexed SSBs,
      determine a second frequency domain corresponding to a second SSB group based on the information on the SSB group, and
      receive, from the base station, an SSB belonging to the second SSB group based on the second frequency domain.

11. The UE of claim 10, wherein the information on the SSB group is included in at least one of a primary synchronization sequence (PSS), a secondary synchronization sequence (SSS), or a physical broadcast channel (PBCH) of the SSB belonging to the first SSB group, and wherein the information on the SSB group includes information on a total number of SSB groups and an SSB group index to which an SSB belongs.

12. The UE of claim 10, wherein the controller is further configured to transmit, to the base station, a random access channel (RACH) preamble on an RACH occasion corresponding to an SSB selected based on a reference signal received power (RSRP) of SSBs belonging to the first SSB group and the second SSB group.

13. A base station in a wireless communication system, the base station comprising:

a transceiver; and a controller coupled to the transceiver and configured to:

determine a synchronization signal block (SSB) group to which each of SSBs belongs, wherein each SSB group is related to a different frequency domain, generate frequency division multiplexed SSBs based on a resource mapping of the SSBs, and transmit, to a user equipment (UE), the frequency division multiplexed SSBs, wherein information on the SSB group is included in an SSB of the frequency division multiplexed SSBs and indicates a location of a frequency domain associated with the frequency division multiplexed SSBs, wherein a first frequency domain corresponding to a first SSB group including the SSB and a second frequency domain corresponding to a second SSB group including another SSB is determined by the UE based on the reception of the SSB.

14. The base station of claim 13, wherein the information on the SSB group is included in at least one of a primary synchronization sequence (PSS), a secondary synchronization sequence (SSS), or a physical broadcast channel (PBCH) of the SSB belonging to the first SSB group, and wherein the information on the SSB group includes information on a total number of SSB groups and an SSB group index to which an SSB belongs.

15. The base station of claim 13, wherein the controller is further configured to receive, from the UE, a random access channel (RACH) preamble on an RACH occasion corresponding to an SSB selected based on a reference signal received power (RSRP) of SSBs belonging to the first SSB group and the second SSB group.

* * * * *